US011178671B2

(12) United States Patent
He

(10) Patent No.: US 11,178,671 B2
(45) Date of Patent: Nov. 16, 2021

(54) HIGH-RELIABILITY MODULATION CODING SCHEME AND LOGICAL CHANNEL PRIORITIZATION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/445,849

(22) Filed: Jun. 19, 2019

(65) Prior Publication Data
US 2019/0394785 A1 Dec. 26, 2019

Related U.S. Application Data

(60) Provisional application No. 62/687,720, filed on Jun. 20, 2018.

(51) Int. Cl.
*H04W 72/10* (2009.01)
*H04W 76/11* (2018.01)
(Continued)

(52) U.S. Cl.
CPC ........... *H04W 72/10* (2013.01); *H04L 1/0004* (2013.01); *H04L 1/0061* (2013.01);
(Continued)

(58) Field of Classification Search
CPC ..... H04W 72/10; H04W 76/11; H04W 76/27; H04W 72/0466; H04W 72/14;
(Continued)

(56) References Cited

U.S. PATENT DOCUMENTS

2018/0324835 A1* 11/2018 Agiwal ............. H04W 72/0453
2018/0368133 A1* 12/2018 Park ..................... H04W 72/048
(Continued)

OTHER PUBLICATIONS

International Search Report and Written Opinion—PCT/US2019/038286—ISA/EPO—dated Sep. 18, 2019.
(Continued)

*Primary Examiner* — Steven H Nguyen
(74) *Attorney, Agent, or Firm* — Holland & Hart LLP/Qualcomm

(57) ABSTRACT

Methods, systems, and devices for wireless communications are described. A base station in a wireless communications system may perform a connection procedure (e.g. radio resource control (RRC) procedure) with a user equipment (UE), during which the base station may configure the UE with logical channel prioritization (LCP) configuration for each logical channel of a set of logical channels. The LCP configuration may indicate allowable modulation coding schemes (MCSs) for each logical channel of the set of logical channels. Following the communication procedure, the UE may receive an uplink grant for transmitting data using a corresponding logical channel of the set of logical channels. The UE may identify an MCS used by the uplink grant and may transmit the data using the corresponding logical channel with the identified MCS, based on the identified MCS of the uplink grant matching an MCS of the logical channel.

28 Claims, 16 Drawing Sheets

(51) Int. Cl.
| | |
|---|---|
| *H04W 76/27* | (2018.01) |
| *H04L 1/00* | (2006.01) |
| *H04L 5/00* | (2006.01) |
| *H04W 72/04* | (2009.01) |
| *H04W 72/14* | (2009.01) |

(52) U.S. Cl.
CPC ....... *H04L 5/0094* (2013.01); *H04W 72/0466* (2013.01); *H04W 72/14* (2013.01); *H04W 76/11* (2018.02); *H04W 76/27* (2018.02)

(58) Field of Classification Search
CPC .............. H04W 72/0406; H04L 1/0004; H04L 1/0061; H04L 5/0094; H04L 1/0016; H04L 1/0023; H04L 1/0002
See application file for complete search history.

(56) References Cited

U.S. PATENT DOCUMENTS

| | | | | |
|---|---|---|---|---|
| 2019/0261408 | A1* | 8/2019 | Lou | H04W 72/1242 |
| 2019/0364586 | A1* | 11/2019 | Li | H04W 72/04 |
| 2020/0196343 | A1* | 6/2020 | Marinier | H04L 1/1854 |

OTHER PUBLICATIONS

Qualcomm Inc (RAPPORTEUR): "[102 Offline #103] Impact of MCS Differentiation on MAC Procedures," 3GPP Draft; R2-1808833 [102 Offline #103] Impact of MCS Differentiation on MAC Procedures_ Summary of Discussion V2, 3rd Generation Partnership Project (3GPP), Mobile Competence Centre; 650, Route Des, vol. RAN WG2, No. Busan, Republic of Korea; May 21, 2018-May 25, 2018, May 25, 2018, XP051503577, 10 Pages, Retrieved from the Internet: URL: http://www.3gpp.org/ftp/tsg%5Fran/WG2%5FRL2/TSGR2%5F102/Docs/R2%2D1808833%2Ezip [retrieved on May 25, 2018] sections 2.2, 2.3 and 2.4.1.

Qualcomm Inc et al.: "New MCS Table and LCP Restrictions," 3GPP Draft; R2-1810426 New MCS Table and LCP Restriction, 3rd Generation Partnership Project (3GPP), Mobile Competence Centre; 650, Route Des Lucioles; F-06921 Sophia-Antipolis Cedex; France, vol. RAN WG2, No. Montreal, Canada; Jul. 2, 2018-Jul. 6, 2018, Jul. 1, 2018, XP051467590, 4 Pages, Retrieved from the Internet: URL: http://www.3gpp.org/ftp/Meetings%5F3GPP%5FSYNC/RAN2/Docs [retrieved on Jul. 1, 2018] Section 2.

Qualcomm Inc: "On Impacts of New MCS Table for URLLC on MAC Procedures," 3GPP Draft; R2-1808575 On Impacts of New MCS Table on MAC Procedures, 3rd Generation Partnership Project (3GPP), Mobile Competence Centre; 650, Route Des Lucioles; F-06921 Sophia-Antipolis Cedex; F, vol. RAN WG2, No. Busan, Korea; May 21, 2018-May 25, 2018, May 20, 2018, XP051444832, 4 Pages, Retrieved from the Internet: URL: http://www.3gpp.org/ftp/Meetings%5F3GPP%5FSYNC/RAN2/Docs/ [retrieved on May 20, 2018] sections 2.1, 2.2 and 2.4.

Samsung: "MAC Impact of Separate MCS/CQI Table for URLLC," 3GPP Draft; R2-1806148 MAC Impact of Separate CQI Tables, 3rd Generation Partnership Project (3GPP), Mobile Competence Centre; 650, Route Des Lucioles; F-06921 Sophia-Antipolis Cedex; France, vol. RAN WG2, No. Sanya China; Apr. 16, 2018-Apr. 20, 2018, Apr. 14, 2018, XP051429718, 5 Pages, Retrieved from the Internet: URL: http://www.3gpp.org/ftp/Meetings%5F3GPP%5FSYNC/RAN2/Docs/ [retrieved on Apr. 14, 2018] section 2.

Samsung: "The Impact of MCS/CQI Design for URLLC on UL Scheduling/LCP," 3GPP Draft; R2-1802448, 3rd Generation Partnership Project (3GPP) Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 14, 2018, XP051399189, 4 pages, Retrieved from the Internet: URL:https://www.3gpp.org/ftp/tsg_ran/WG2_RL2/TSGR2_101/Docs/ [retrieved on Feb. 14, 2018] section 2.2.

* cited by examiner

HIGH-RELIABILITY MODULATION CODING SCHEME AND LOGICAL CHANNEL PRIORITIZATION

CROSS REFERENCE

The present Application for Patent claims the benefit of U.S. Provisional Patent Application No. 62/687,720 by He, entitled "HIGH-RELIABILITY MODULATION CODING SCHEME AND LOGICAL CHANNEL PRIORITIZATION," filed Jun. 20, 2018, assigned to the assignee hereof, and expressly incorporated herein.

BACKGROUND

The following relates generally to wireless communications, and more specifically to high-reliability modulation coding scheme (MCS) and logical channel prioritization (LCP).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

UEs within a wireless communications system may have different requirements based on an application or deployment scenario. Systems may, therefore, be designed to support multiple wireless communications services. For example, a system may support wireless communication services with certain enhanced reliability and latency targets. However, resource configurations and certain transmission restrictions, for example, may limit the system's ability to achieve such targets.

SUMMARY

The described techniques relate to improved methods, systems, devices, and apparatuses that support high-reliability modulation coding scheme (MCS) and logical channel prioritization (LCP) in accordance with various aspects of the present disclosure. Generally, the described techniques provide for transmission of communications data having certain reliability and latency thresholds. For example, a base station and user equipment (UE) may be in communication with each other, and the UE may support the use of low latency services, such as ultra-reliable low latency communications (URLLC). The base station may configure an LCP configuration for each logical channel of a set of logical channels for a UE during a connection procedure with the UE (e.g., radio resource control (RRC) procedure). The LCP configuration may indicate allowable MCSs for each logical channel of the set of logical channels. In some cases, the LCP configuration may indicate allowable MCS tables configured by the base station for low spectral efficiencies that may enable transmissions to achieve high-reliability (e.g., URLCC). Following the connection procedure, the UE may receive an uplink grant from the base station for transmitting data using a corresponding logical channel. The UE may identify an MCS of the uplink grant and determine whether the identified MCS matches an MCS configured for the corresponding logical channel using information provided by the LCP configuration, prior to transmitting data on the corresponding logical channel. Differentiating MCS in the LCP configuration may enable the base station and the UE to provide improved support for URLLC. Indicating allowable MCSs in the LCP configuration may provide a more efficient coordination scheme for communicating data having high-reliability and low-latency requirements, and may enhance communication and reduce latency between the base station and the UE.

A method of wireless communications is described. The method may include receiving an LCP configuration for each logical channel of a set of logical channels during a connection procedure with a base station, the LCP configuration indicating allowable MCSs for each logical channel of the set of logical channels, receiving an uplink grant for transmitting data using a corresponding logical channel of the set of logical channels, identifying an MCS associated with the received uplink grant, and transmitting the data using the corresponding logical channel with the identified MCS.

An apparatus for wireless communications is described. The apparatus may include a processor, memory in electronic communication with the processor, and instructions stored in the memory. The instructions may be executable by the processor to cause the apparatus to receive an LCP configuration for each logical channel of a set of logical channels during a connection procedure with a base station, the LCP configuration indicating allowable MCSs for each logical channel of the set of logical channels, receive an uplink grant for transmitting data using a corresponding logical channel of the set of logical channels, identify an MCS associated with the received uplink grant, and transmit the data using the corresponding logical channel with the identified MCS.

Another apparatus for wireless communications is described. The apparatus may include means for receiving an LCP configuration for each logical channel of a set of logical channels during a connection procedure with a base station, the LCP configuration indicating allowable MCSs for each logical channel of the set of logical channels, receiving an uplink grant for transmitting data using a corresponding logical channel of the set of logical channels, identifying an MCS associated with the received uplink grant, and transmitting the data using the corresponding logical channel with the identified MCS.

A non-transitory computer-readable medium storing code for wireless communications is described. The code may include instructions executable by a processor to receive an LCP configuration for each logical channel of a set of logical channels during a connection procedure with a base station, the LCP configuration indicating allowable MCSs for each logical channel of the set of logical channels, receive an uplink grant for transmitting data using a corresponding logical channel of the set of logical channels, identify an MCS associated with the received uplink grant, and transmit the data using the corresponding logical channel with the identified MCS.

Some examples of the method, apparatuses, and non-transitory computer-readable medium described herein may further include operations, features, means, or instructions for refraining from using the corresponding logical channel for the received uplink grant based on the MCS associated with the received uplink grant being different from the allowable MCSs for the corresponding logical channel.

Some examples of the method, apparatuses, and non-transitory computer-readable medium described herein may further include operations, features, means, or instructions for identifying a second corresponding logical channel from the set of logical channels configured with the MCS associated with the received uplink grant based on comparing the MCS associated with the received uplink grant with the allowable MCSs for the second corresponding logical channel and selecting the second corresponding logical channel for transmitting the data based on the allowable MCSs configured for the second corresponding logical channel including the MCS associated with the received uplink grant.

Some examples of the method, apparatuses, and non-transitory computer-readable medium described herein may further include operations, features, means, or instructions for identifying the allowable MCSs for each logical channel of the set of logical channels based on an indication in a field of a logical channel configuration information element (IE) in the LCP configuration.

Some examples of the method, apparatuses, and non-transitory computer-readable medium described herein may further include operations, features, means, or instructions for identifying the MCS associated with the received uplink grant based on at least one transmission parameter associated with the received uplink grant and comparing the MCS associated with the received uplink grant with the allowable MCSs indicated in the LCP configuration for the corresponding logical channel based on identifying the MCS using the at least one transmission parameter.

Some examples of the method, apparatuses, and non-transitory computer-readable medium described herein may further include operations, features, means, or instructions for determining a set of allowed subcarrier spacing index values in a field of the LCP configuration for the corresponding logical channel of the set of logical channels, identifying that the set of allowed subcarrier spacing index values in the field of the LCP configuration for the corresponding logical channel includes a subcarrier spacing index associated with the received uplink grant and determining whether to use the corresponding logical channel for the received uplink grant based on determining that the set of allowed subcarrier spacing index values in the field of the LCP configuration include the subcarrier spacing index associated with the received uplink grant, where transmitting the data using the corresponding logical channel may be further based on the determining.

Some examples of the method, apparatuses, and non-transitory computer-readable medium described herein may further include operations, features, means, or instructions for determining that a maximum physical uplink shared channel (PUSCH) transmission duration indicated in the LCP configuration for the corresponding logical channel may be greater than or equal to a PUSCH transmission duration associated with the received uplink grant and determining whether to use the corresponding logical channel for the received uplink grant based on determining that the maximum PUSCH transmission duration indicated in the LCP configuration may be greater than or equal to a PUSCH transmission duration associated with the received uplink grant, where transmitting the data using the corresponding logical channel may be further based on the determining.

Some examples of the method, apparatuses, and non-transitory computer-readable medium described herein may further include operations, features, means, or instructions for determining an uplink grant type in a field of the LCP configuration, comparing a type of the received uplink grant with the uplink grant type in the field of the LCP configuration and determining whether to use the corresponding logical channel for the received uplink grant based on comparing the type of the received uplink grant with the uplink grant type in the field of the LCP configuration, where transmitting the data using the corresponding logical channel may be further based on the determining.

Some examples of the method, apparatuses, and non-transitory computer-readable medium described herein may further include operations, features, means, or instructions for identifying cell information associated with the base station based on at least one transmission parameter of the uplink grant, comparing the identified cell information with cell information in a field of the LCP configuration and determining whether to use the corresponding logical channel for the received uplink grant based on comparing the identified cell information with cell information in the field of the LCP configuration, where transmitting the data associated with the service using the corresponding logical channel may be further based on the determining.

A method of wireless communications is described. The method may include generating an LCP configuration for each logical channel of a set of logical channels associated with a UE, the LCP configuration indicating allowable MCSs for each logical channel of the set of logical channels, transmitting the LCP configuration to the UE during a connection procedure with the UE, and transmitting to the UE an uplink grant for transmitting data using a corresponding logical channel of the set of logical channels, the uplink grant indicating an MCS and information associated with one or more transmission parameters of the uplink grant.

An apparatus for wireless communications is described. The apparatus may include a processor, memory in electronic communication with the processor, and instructions stored in the memory. The instructions may be executable by the processor to cause the apparatus to generate an LCP configuration for each logical channel of a set of logical channels associated with a UE, the LCP configuration indicating allowable MCSs for each logical channel of the set of logical channels, transmit the LCP configuration to the UE during a connection procedure with the UE, and transmit to the UE an uplink grant for transmitting data using a corresponding logical channel of the set of logical channels, the uplink grant indicating an MCS and information associated with one or more transmission parameters of the uplink grant.

Another apparatus for wireless communications is described. The apparatus may include means for generating an LCP configuration for each logical channel of a set of logical channels associated with a UE, the LCP configuration indicating allowable MCSs for each logical channel of the set of logical channels, transmitting the LCP configuration to the UE during a connection procedure with the UE, and transmitting to the UE an uplink grant for transmitting data using a corresponding logical channel of the set of logical channels, the uplink grant indicating an MCS and information associated with one or more transmission parameters of the uplink grant.

A non-transitory computer-readable medium storing code for wireless communications is described. The code may include instructions executable by a processor to generate an LCP configuration for each logical channel of a set of logical channels associated with a UE, the LCP configuration indicating allowable MCSs for each logical channel of the set of logical channels, transmit the LCP configuration to the UE during a connection procedure with the UE, and transmit to the UE an uplink grant for transmitting data using a corresponding logical channel of the set of logical channels, the uplink grant indicating an MCS and information associated with one or more transmission parameters of the uplink grant.

Some examples of the method, apparatuses, and non-transitory computer-readable medium described herein may further include operations, features, means, or instructions for scrambling a cyclic redundancy check (CRC), in a downlink control information (DCI), with a radio network temporary identifier (RNTI) and a cell-RNTI (C-RNTI), where transmitting the uplink grant may be further based on the scrambling.

Some examples of the method, apparatuses, and non-transitory computer-readable medium described herein may further include operations, features, means, or instructions for selecting one or more physical downlink control channel (PDCCH) candidates for transmitting the uplink grant, where the PDCCH candidates may be associated with a UE-specific search space or a common search space, where transmitting the uplink grant may be further based on using the PDCCH candidates.

DETAILED DESCRIPTION

Figure 1:
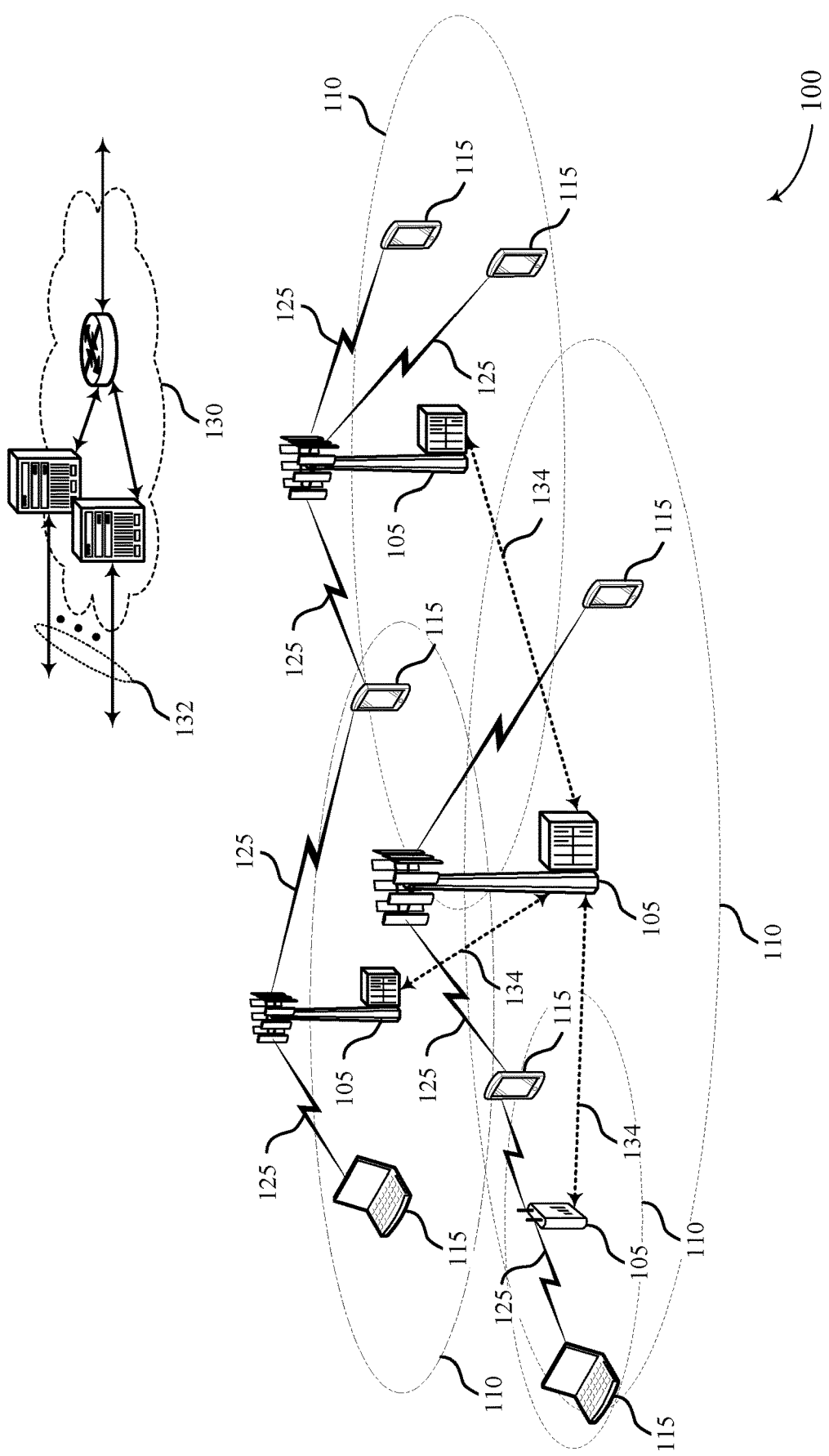
FIGS. 1 and 2 illustrate examples of a wireless communications system that supports high-reliability modulation coding scheme (MC S) and logical channel prioritization (LCP) in accordance with aspects of the present disclosure.

A base station may configure and support an allowable modulation coding scheme (MCS) table or a set of allowable MCS tables for low spectral efficiencies that may enable transmissions to achieve a high reliability, for example, a certain block error rate (BLER). These allowable MCS tables may benefit ultra-reliable low latency communications (URLLC) systems having high-reliability and low-latency requirements, by achieving a low BLER using allowable MCSs in the allowable MCS table. The base station may perform a communication procedure (e.g., a radio resource control (RRC) procedure, such as a cell acquisition procedure, random access procedure, RRC connection procedure, RRC configuration procedure) with the UE. As part of the communication procedure, the base station may configure the UE with allowable MCSs in an allowable MCS table for each logical channel in a set of logical channels. The allowable MCS table(s) for each logical channel may be provided in a logical channel prioritization (LCP) configuration (also referred to herein as "LCP restriction").

Following the connection procedure, the UE may receive an uplink grant from the base station for transmitting data (e.g., URLLC data) using a corresponding logical channel. The UE may identify an MCS of the uplink grant and determine whether the identified MCS matches an MCS configured for the corresponding logical channel using information provided by the LCP configuration, prior to transmitting data on the corresponding logical channel. That is, when the UE receives an uplink grant, for each logical channel, the UE determines whether the LCP configuration (e.g., allowable MCS in an allowable MCS table) configured for that logical channel includes the corresponding MCS of the received uplink grant. For example, a first logical channel (LC1) may be configured with a first allowable MCS table and a second allowable MCS table, while a second logical channel (LC2) may be configured with the first allowable MCS table. As such, if the UE receives an uplink grant which indicates the second allowable MCS table, the first logical channel (LC1) may be eligible to be used for the uplink grant. Alternatively, if the uplink grant indicates the first allowable MCS table, both the first and second logical channels (LC1 and LC2) may be used for the uplink grant. Differentiating MCS in LCP configuration may enable the base station and the UE to provide improved support for URLLC. Indicating allowable MCSs in LCP configuration may provide for more efficient coordination of data communications having high-reliability and low-latency requirements and may enhance communication and reduce latency between the base station and the UE.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to high-reliability MCS and LCP.

FIG. 1 illustrates an example of a wireless communications system 100 that supports high-reliability MCS and LCP in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 and a UE 115 may be in communication with each other, and the UE 115 may support the use of low latency services, such as URLLC. The base station 105 may configure an LCP configuration for each logical channel of a set of logical channels for a UE 115 during a connection procedure with the UE 115. The LCP configuration may indicate allowable MCSs for each logical channel of the set of logical channels. In some cases, the LCP configuration may indicate allowable MCS tables configured by the base station 105 for low spectral efficiencies that may allow transmissions to achieve high-reliability (e.g., URLLC).

Following the connection procedure, the UE 115 may receive an uplink grant from the base station 105 for transmitting data using a corresponding logical channel. The UE 115 may identify an MCS of the uplink grant and determine whether the identified MCS matches an MCS configured for the corresponding logical channel using information provided by the LCP configuration, prior to transmitting data on the corresponding logical channel. That is, when a UE 115 receives an uplink grant, for each logical channel, the UE 115 checks whether the LCP configuration (e.g., allowable MCS in an allowable MCS table) configured for that logical channel includes the corresponding MCS of the received uplink grant. For example, a first logical channel may be configured with a first allowable MCS table and a second allowable MCS table, while a second logical channel may be configured with the first allowable MCS table. As such, if the UE 115 receives an uplink grant which indicates the second allowable MCS table, the first logical channel may be eligible to be used for the uplink grant. Alternatively, if the uplink grant indicates the first allowable MCS table, both the first and second logical channels may be used for the uplink grant.

Differentiating MCS in LCP configuration may enable the base station 105 and the UE 115 to provide improved support for URLLC. Indicating allowable MCSs in LCP configuration may provide for more efficient coordination of data communications having high-reliability and low-latency requirements and may enhance communication and reduce latency between the base station 105 and the UE 115.

Figure 2:
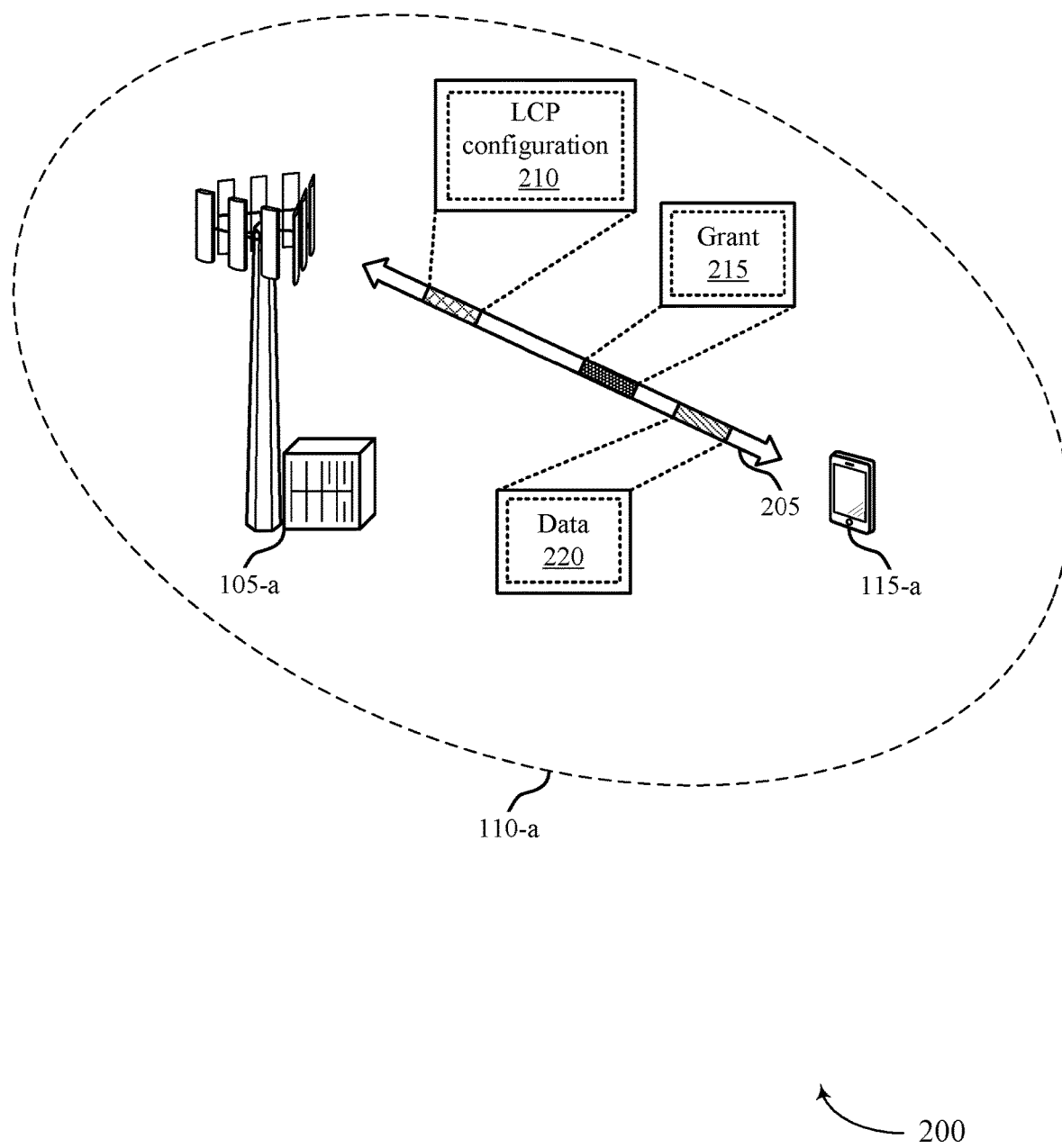

FIG. 2 illustrates an example of a wireless communications system 200 that supports high-reliability MCS and LCP in accordance with various aspects of the present disclosure. The wireless communications system 200 may include a base station 105-a and a UE 115-a, which may be examples of the corresponding devices described with reference to FIG. 1. The wireless communications system 200 may also implement aspects of the wireless communications system 100. For example, the wireless communications system 200 may support URLLC communications (e.g., system 200 may be a URLLC system), in which the base station 105-a and/or the UE 115-a support certain latency and reliability requirements. The base station 105-a may communicate with the UE 115-a within a coverage area 110-a.

The base station 105-a may configure and support an allowable MCS table or a set of allowable MCS tables for low spectral efficiencies that may allow transmissions to achieve a high reliability, for example, a BLER target of $10^{-5}$. These allowable MCS tables may benefit URLLC systems having high-reliability and low-latency requirements by achieving a low BLER using allowable MCSs in the allowable MCS table. For example, a data transmission from the UE 115-a to the base station 105-a using an allowable MCS in the allowable MCS table may be successful in a single transmission, resulting in low latency.

The base station 105-a may perform a communication procedure (e.g., an RRC procedure, such as a cell acquisition procedure, random access procedure, RRC connection procedure, RRC configuration procedure) with the UE 115-a. The base station 105-a may be configured with multiple antennas, which may be used for directional or beamformed transmissions. As part of the communication procedure, the base station 105-a may establish a bi-directional communication link 205 for communication. Additionally, or alternatively, as part of the communication procedure, the base station 105-a may configure the UE 115-a with an allowable MCS and resource allocation (e.g., time and frequency resources) via higher-layer signaling or RRC signaling. In some cases, the UE 115-a may provide a UE capability to the base station 105-a, such that the base station 105-a may configure the UE 115-a based on the UE capability. For example, a UE capability may indicate that the UE 115-a supports standing 16 QAM, 64 QAM, 256 QAM, or 1024 QAM, or a combination thereof. The base station 105-a, as part of the communication procedure, may provide an allowable MCS table, or an indication of an allowable MCS table, for a corresponding logical channel of the UE 115-a.

Some techniques may employ an sTTI to attempt obtaining high-reliability and low-latency for a transmission in a URLLC system. However, using an sTTI to reach high-reliability and low-latency requirements may be challenging if a transmission is performed using an MCS with a conventional BLER rate (e.g., $10^{-1}$), because multiple HARQ retransmissions may be performed to obtain the high-reliability requirement for the URLLC system. As a result, the latency related to the overall transmission delay may be a product of the number of sTTIs and the number of HARQ retransmissions.

According to an example technique, to meet the high-reliability and low-latency requirements of URLLC systems, the base station 105-a may assign an sTTI for each transmission by using multiple subcarriers on a numerology with a wide subcarrier spacing. This technique may not reach reliability requirements, given that each transmission is still less reliable compared with a technique that concentrates transmission power on a smaller number of subcarriers over a numerology with a narrower subcarrier spacing. The numerology may refer to the configuration of waveform parameters (e.g., related to a carrier or a group of subcarriers), and different numerologies may include OFDM-based subframes having different parameters such as subcarrier spacing, symbol time, cyclic prefix (CP) size, etc. As such, for data transmissions related to services having high-reliability and low-latency requirements, the base station 105-a may schedule the data transmission using uplink grants associated with both sTTI and high-reliability MCS.

The base station 105-a may provide an indication of a maximum TTI duration in an LCP configuration 210 for an uplink grant 215. The UE 115-a may transmit data 220 associated with the uplink grant 215 using a corresponding logical channel (e.g., indicated in the uplink grant 215), which may be a traffic channel for carrying user-plane data or a control channel for carrying control-plane information related to URLLC services. For example, the UE 115-a may use a traffic logical channel, such as a dedicated traffic channel (DTCH) for transmission of user data or a multicast traffic channel (MTCH) for transmission of multicast data, during the maximum TTI duration. Indicating a maximum TTI duration associated with the uplink grant 215 in the LCP configuration 210, however, may not meet high-reliability and low-latency requirements because different uplink grants may be associated with different MCSs. For instance, two uplink grants associated with a same TTI duration, but different reliability levels, may have different reliabilities and/or latencies associated with the corresponding uplink transmissions.

The UE 115-a may be configured by the base station 105-a, as part of the communication procedure, to support the allowable MCS table or set of allowable MCS tables that support low spectral efficiencies for URLLC systems. To mitigate the shortcoming of some techniques, the base station 105-a may configure an allowable MCS table or set of allowable MCS tables for a corresponding logical channel by indicating the allowable MCS table(s) in the LCP configuration 210 (e.g., also referred to herein as "LCP restrictions"), while maintaining existing LCP configuration. For example, an eMBB service may require low latency but not high reliability, and in this case the base station 105-*a* may only need to indicate the maximum TTI in the LCP configuration 210. If the base station 105-*a* determines to more efficiently use resources (e.g., time and frequency resources) for the eMBB service, the base station 105-*a* may further configure the LCP configuration 210 such that the UE 115-*a* uses uplink grants with high-reliability MCS because these grants may have low spectral efficiency.

In some cases, the UE 115-*a* may receive the LCP configuration 210 for each logical channel of a set of logical channels during the communication procedure with the base station 105-*a*. The LCP configuration 210 may indicate allowable MCSs for each logical channel of the set of logical channels. In an example, the base station 105-*a* may use a field of a logical channel configuration information element (IE) in the LCP configuration 210 (e.g., allowedMCS-Tables in LogicalChannel-ConfigIE) to indicate an allowable MCS for each logical channel. The logical channel configuration IE in the LCP configuration 210 may include a bitmap that may associate allowable MCSs with each corresponding logical channel of the set of logical channels. The UE 115-*a* may decode the bitmap and identify the allowable MCSs for a corresponding logical channel. After the communication procedure, the base station 105-*a* may transmit, to the UE 115-*a* via bi-directional communication link 205, an uplink grant 215 in a downlink control information (DCI) message to enable UE 115-*a* to transmit data 220 using a corresponding logical channel of the set of logical channels, as well as using one or more transmission parameters (e.g. a numerology of a carrier, duration of the uplink grant).

Prior to transmitting data 220 using a logical channel, the UE 115-*a* may determine whether the MCS associated with the uplink grant 215 matches an allowable MCSs configured for the logical channel. If the MCS indicated in the uplink grant 215 matches the allowable MCSs configured for the logical channel, for example, as indicated by the LCP configuration 210, the UE 115-*a* may transmit data 220 using the corresponding logical channel. Otherwise, the UE 115-*a* may refrain from using the corresponding logical channel for the uplink grant 215. Refraining from using the corresponding logical channel, in cases where the MCSs do not match, may eliminate processing overhead and latency associated with transmitting data 220 using a lower-reliability MCS.

The base station 105-*a* may signal the MCS associated with the uplink grant 215 via one or more methods. An example method may use a new dedicated radio network temporary identifier (RNTI) in addition to a cell-RNTI (C-RNTI) to indicate an allowable MCS for each logical channel. The base station 105-*a* may configure the new dedicated RNTI and the C-RNTI for the UE 115-*a* as part of the communication procedure (e.g., random access procedure). The base station 105-*a* may use the new dedicated RNTI to transmit a physical downlink control channel (PDCCH) scheduling message (e.g. including the uplink grant 215) to the UE 115-*a*. For example, the new dedicated RNTI may indicate the identity of UEs that should read the scheduling message and a type of information that is being scheduled (e.g., URLLC-related data). As such, if the base station 105-*a* configures the new dedicated RNTI in addition to the C-RNTI, all downlink control information with a CRC scrambled by the new dedicated RNTI may be designated as using an allowable MCS from the allowable MCS table configured for a logical channel via the LCP configuration 210.

As part of processing the PDCCH prior to transmitting the PDCCH to the UE 115-*a*, the base station 105-*a* may manipulate downlink control information carrying the uplink grant 215 by attachment of a CRC in a manner that depends on the new dedicated RNTI of the target UE (e.g. UE 115-*a*). For example, the base station 105-*a* may scramble the CRC with the new dedicated RNTI and/or the C-RNTI. As described above, the scrambled CRC with the new dedicated RNTI and/or the C-RNTI may be an indication to the UE 115-*a* that the uplink grant 215 uses an allowable MCS from the allowable MCS table. After scrambling the CRC, the base station 105-*a* may process the PDCCH using quadrature phase shift keying (QPSK) modulation and map the PDCCH onto allocated resource elements.

The resource element mapping for the PDCCH may be arranged using control channel elements. Depending on the length of the downlink control information, the base station 105-*a* may transmit the PDCCH scheduling message by mapping the message onto one, two, four or eight consecutive control channel elements. The control channel elements may also be organized into search spaces, which may be a common search space or a UE-specific search space. The common search space may be available to all UEs in a cell associated with the base station 105-*a* and may be located at fixed positions within a downlink control region. Alternatively, the UE-specific search space may be assigned to groups of UEs or a certain UE (e.g. UE 115-*a*) and have locations that depend on the new dedicated RNTI. Each search space may contain up to 16 control channel elements, such that the search space contains several locations where the base station 105-*a* may transmit downlink control information including the uplink grant 215.

The UE 115-*a* may receive the PDCCH scheduling message by identifying a control format indicator and establishes a size of the downlink control region and locations of common and UE-specific search spaces. Within each search space, the UE 115-*a* identifies possible PDCCH candidates, which are control channel elements where the base station 105-*a* might have transmitted the DCI. The UE 115-*a* then attempts to process each PDCCH candidate, using the new dedicated RNTI. If the UE 115-*a* identifies that a decoded CRC bit of a PDCCH candidate matches the new dedicated RNTI, the UE 115-*a* may process (e.g. decode, unscramble) the corresponding DCI message. For example, the UE 115-*a* may unscramble the DCI carrying the uplink grant 215 and determine that the CRC of the DCI includes the dedicated RNTI and/or the C-RNTI. As a result, the UE 115-*a* may determine an MCS of the uplink grant 215 based on the new dedicated RNTI and/or the C-RNTI. For example, the UE 115-*a* may determine that the uplink grant 215 uses an allowable MCS from at least one of the allowable MCS tables indicated in the LCP configuration 210 for a corresponding logical channel of the uplink grant 215.

Alternatively, in some cases the UE 115-*a* may determine an absence of an RNTI configuration for the UE 115-*a* and identify the allowable MCSs for each logical channel of the set of logical channels based on an indication in a field of a physical uplink shared channel (PUSCH) configuration IE (e.g., mcs-Table field in PUSCH-ConfigIE) If no RNTI is configured and a value in the field of the PUSCH configuration IE matches an allowable MCS table of a corresponding logical channel, then DCI transmitted in a UE-specific search space may use an allowable MCS in the allowable MCS table and DCI transmitted in a common search space may use an MCS in another MCS table (e.g. conventional MCS table).

For example, the UE 115-a may receive the DCI associated with the uplink grant 215 and determine that the search space associated with the uplink grant 215 is a UE-specific search space. In this example, the UE 115-a may identify that the MCS associated with the uplink grant 215 is a certain MCS. The UE 115-a may then compare the MCS associated with the uplink grant 215 and an allowable MCS of a corresponding logical channel. If a match exists, the UE 115-a may transmit data 220 associated with the uplink grant 215 using the corresponding logical channel. Otherwise, the UE 115-a may refrain from transmitting data 220. For example, the UE 115-a may determine that the search space associated with the uplink grant 215 is a common search space and identify that the MCS of the uplink grant 215 is an MCS that is not in at least one MCS table configured for the corresponding logical channel via the LCP configuration 210. As a result, the UE 115-a may refrain from transmitting data 220.

The UE 115-a may also determine a set of allowed subcarrier spacing index values in a field of the LCP configuration 210 (e.g., allowedSCS-List) for the corresponding logical channel of the set of logical channels, and identify that the set of allowed subcarrier spacing index values in the field of the LCP configuration 210 for the corresponding logical channel includes a subcarrier spacing index associated with the uplink grant 215. The UE 115-a may determine whether to use the corresponding logical channel for the uplink grant 215 based on determining that the set of allowed subcarrier spacing index values in the field of the LCP configuration 210 includes the subcarrier spacing index associated with the uplink grant 215.

In some cases, the UE 115-a may determine that a maximum PUSCH transmission duration (e.g., maxPUSCH-Duration) indicated in the LCP configuration 210 for the corresponding logical channel is greater than or equal to a PUSCH transmission duration associated with the received uplink grant 215. In this case, the UE 115-a may determine whether to use the corresponding logical channel for transmitting data 220 corresponding to the received uplink grant 215 based on determining that the maximum PUSCH transmission duration indicated in the LCP configuration 210 is greater than or equal to a PUSCH transmission duration associated with the received uplink grant 215. In some cases, the UE 115-a may determine a type for an uplink grant in a field of the LCP configuration 210 (e.g., configuredGrant-TypeIAllowed), and compare a type of the uplink grant 215 with the uplink grant type in the field of the LCP configuration 210. The UE 115-a may determine whether to use the corresponding logical channel for transmitting data 220 corresponding to the uplink grant 215 based on comparing the type of the uplink grant 215 with the uplink grant type in the field of the LCP configuration 210. If the types match, the UE 115-a may use the corresponding logical channel for transmitting data 220 corresponding to the uplink grant 215. Otherwise, the UE 115-a may refrain from using the corresponding logical channel.

The UE 115-a may additionally, or alternatively identify cell information associated with the base station 105-a based on at least one transmission parameter associated with the uplink grant 215, and compare the identified cell information with cell information in a field of the LCP configuration 210 (e.g., allowedServingCells). For example, cell information in a field of the LCP configuration 210 may be configured to include the MCS table used by the uplink grant 215.

The UE 115-a may determine whether to use the corresponding logical channel for transmitting data 220 corresponding to the received uplink grant 215 based on comparing the identified cell information with cell information in a field of the LCP configuration 210. In some cases, the subcarrier spacing index, PUSCH transmission duration, cell information, and allowable MCS tables may be included in the uplink transmission information received from lower layers for the corresponding scheduled uplink transmission (e.g., data 220).

In some cases, the UE 115-a may identify a second corresponding logical channel from the set of logical channels configured with the MCS associated with the received uplink grant 215, based on comparing the MCS associated with the received uplink grant 215 with the allowable MCSs for the second corresponding logical channel. The UE 115-a may select the second corresponding logical channel for transmitting data 220 based on the allowable MCSs configured for the second corresponding logical channel including the MCS associated with the received uplink grant 215. The UE 115-a may communicate data 220 to the base station 105-a on a corresponding logical channel having an MCS configured to the logical channel.

The base station 105-a may differentiate MCS in LCP configuration in addition to providing maximum TTI, to support URLLC. That is, the base station 105-a provides a new condition in the LCP configuration indicating allowable MCS or allowable MCS tables for a corresponding logical channel. If the logical channel is configured, the allowable MCS tables specifies one or more MCSs that a corresponding logical channel may use. If the logical channel is not configured, no restrictions on MCS are applied to a logical channel. By providing a more efficient coordination of data communications having high-reliability and low-latency requirements by indicating allowable MCSs in LCP configuration 210, communication may be enhanced, and latency reduced, between the base station 105-a and the UE 115-a.

Figure 3:
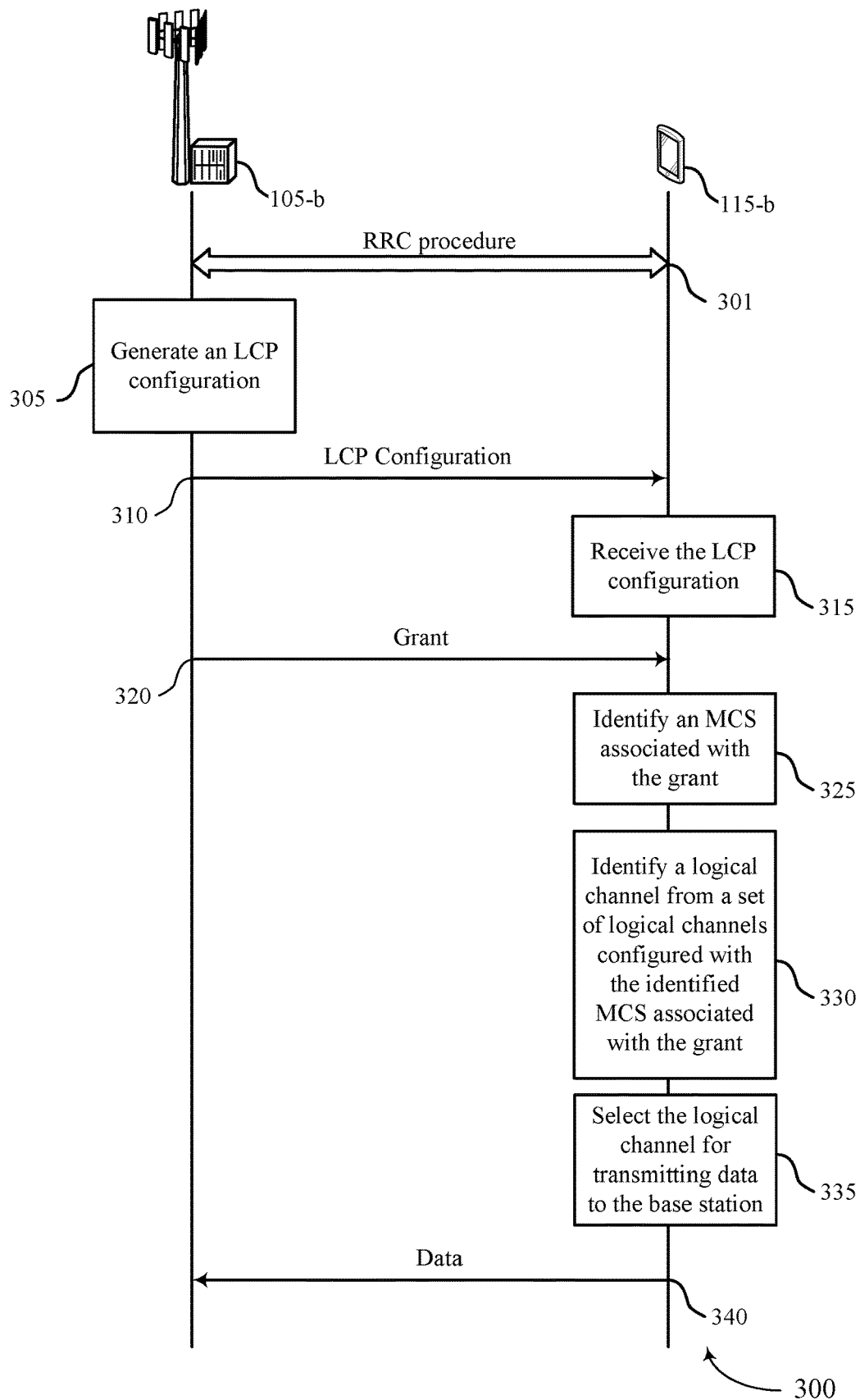
FIG. 3 illustrates an example of a process flow that supports high-reliability MCS and LCP in accordance with aspects of the present disclosure.

FIG. 3 illustrates an example of a process flow 300 that supports high-reliability MCS and LCP in accordance with various aspects of the present disclosure. The process flow 300 may include a base station 105-b and UE 115-b, which may be examples of the corresponding devices described with reference to FIGS. 1 and 2. In some examples, the process flow 300 may implement aspects of the wireless communications system 100 and 200. For example, the base station 105-b and/or the UE 115-b may support certain latency and reliability requirements for URLLC communications (e.g., within a URLLC system).

In the following description of the process flow 300, the operations between the base station 105-b and the UE 115-b may be transmitted in a different order than the exemplary order shown, or the operations performed by the base station 105-b and the UE 115-b may be performed in different orders or at different times. Certain operations may also be left out of the process flow 300, or other operations may be added to the process flow 300.

In some examples, at 301, the process flow 300 may begin with the base station 105-b establishing a connection with the UE 115-b (e.g., performing a cell acquisition procedure, a random access procedure, an RRC connection procedure, an RRC configuration procedure).

At 305, the base station 105-b may generate an LCP configuration for each logical channel of a set of logical channels associated with the UE 115-b. In some examples, the LCP configuration may indicate allowable MCSs for each logical channel of the set of logical channels. At 310, the base station 105-*b* may transmit the LCP configuration to the UE 115-*b*. In some examples, the base station 105-*b* may transmit the LCP configuration to the UE 115-*b* when establishing a connection with the UE 115-*b* (e.g., during an RRC connection procedure, such as at 301). At 315, the UE 115-*b* may receive the LCP configuration from the base station 105-*b*.

At 320, the base station 105-*b* may transmit a grant to the UE 115-*b*. For example, the base station 105-*b* may transmit a grant for transmitting data using a corresponding logical channel of the set of logical channels. The grant may be associated with a certain MCS. At 325, the UE 115-*b* may identify an MCS associated with the grant. For example, the UE 115-*b* may identify the MCS associated with the grant based on at least one transmission parameter associated with the received grant.

At 330, the UE 115-*b* may identify a logical channel from a set of logical channels configured with the identified MCS associated with the grant. At 335, the UE 115-*b* may select the logical channel for transmitting data to the base station 105-*b*. That is, when the UE 115-*b* receives the grant, for each logical channel, the UE 115-*b* checks whether the LCP configuration (e.g., allowable MCS in an allowable MCS table) configured for that logical channel includes the corresponding MCS of the received grant. For example, a first logical channel may be configured with a first allowable MCS table and a second allowable MCS table, while a second logical channel may be configured with the first allowable MCS table. As such, if the UE 115-*b* receives a grant which indicates the second allowable MCS table, the first logical channel may be eligible to be used for the grant. Alternatively, if the grant indicates the first allowable MCS table, both the first and second logical channels can be used for the grant. Another example, the UE 115-*b* may receive that grant and at the PHY layer, the UE 115-*b* may determine which MCS table is associated with the grant (e.g., based on either the RNTI used to scramble the grant or the search space in which the grant is received). The UE 115-*b* may pass this information from the PHY layer, together with other transmission parameters of the grant, to the MAC layer of the UE 115-*b*. The MAC layer may use the information to select a corresponding logical channel from the set of logical channels. At 340, the UE 115-*b* may transmit the data to the base station 105-*b* using the selected logical channel.

Figure 4:
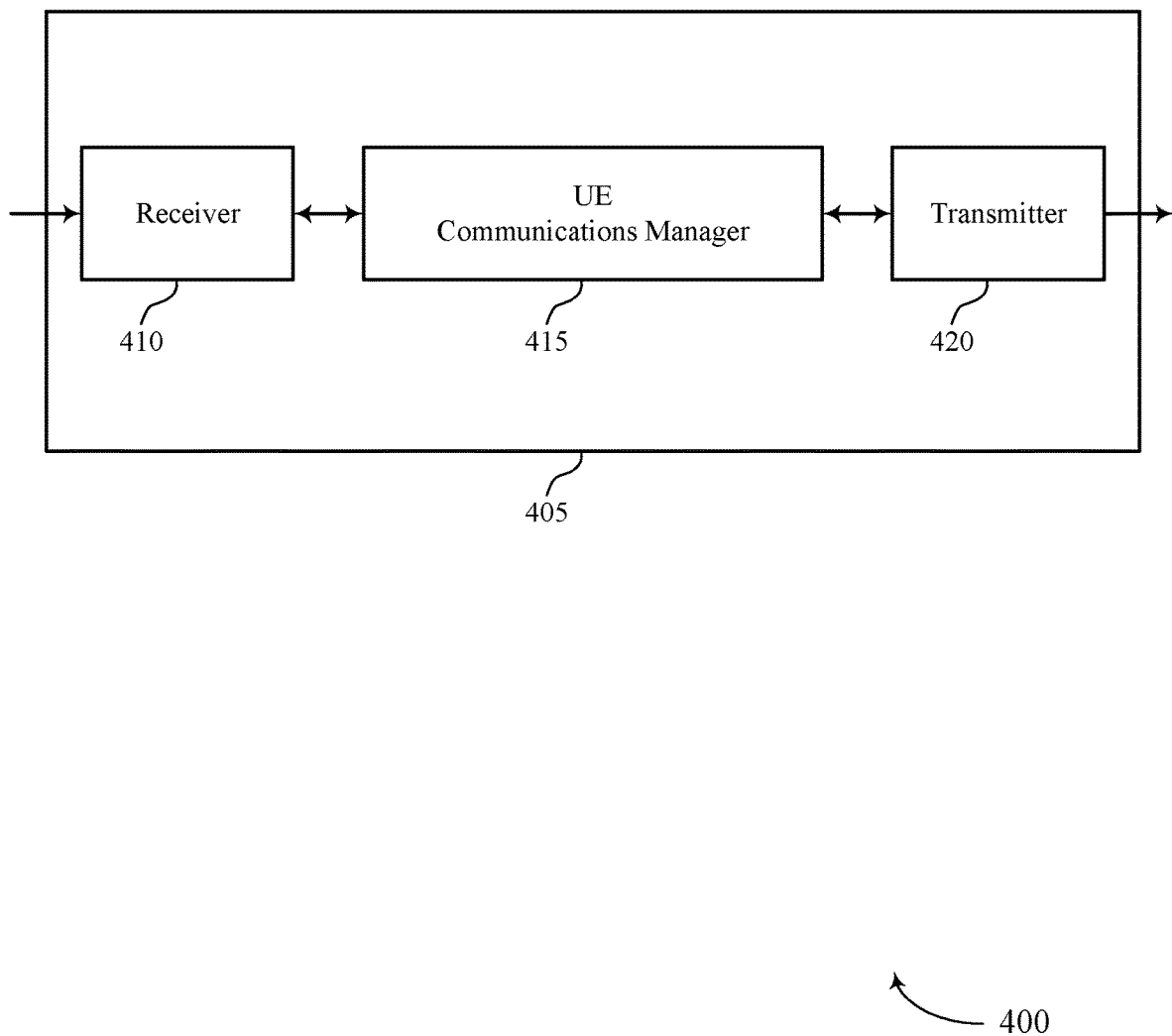
FIGS. 4 and 5 show block diagrams of devices that support high-reliability MCS and LCP in accordance with aspects of the present disclosure.

FIG. 4 shows a block diagram 400 of a device 405 that supports high-reliability MCS and LCP in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to high-reliability MCS and LCP, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may receive an LCP configuration for each logical channel of a set of logical channels during a connection procedure with a base station, the LCP configuration indicating allowable MCSs for each logical channel of the set of logical channels, receive an uplink grant for transmitting data using a corresponding logical channel of the set of logical channels, identify an MCS associated with the received uplink grant, and transmit the data using the corresponding logical channel with the identified MCS. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.)

Figure 5:
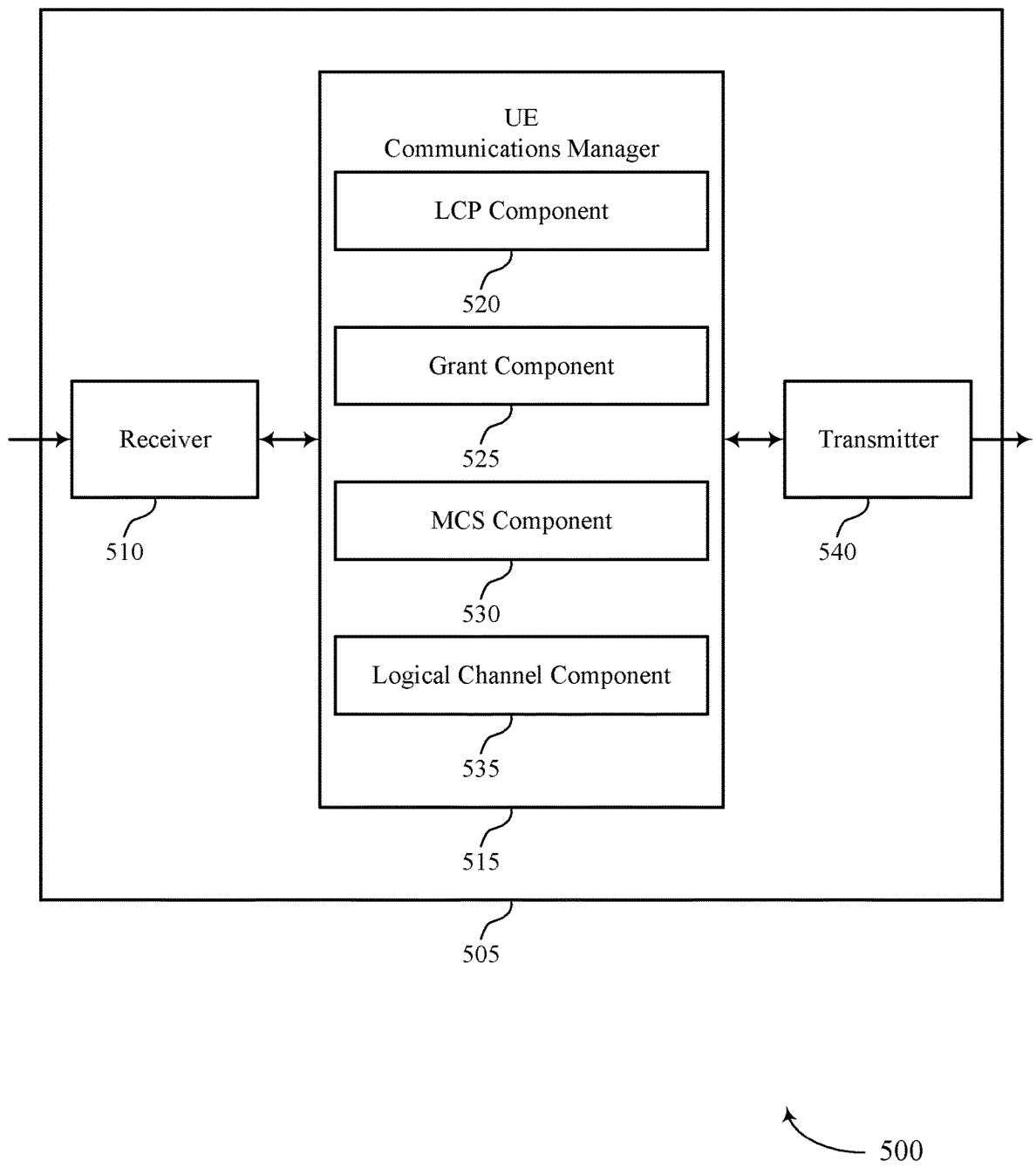

FIG. 5 shows a block diagram 500 of a device 505 that supports high-reliability MCS and LCP in accordance with aspects of the present disclosure. The device 505 may be an example of aspects of a device 405 or a UE 115 as described herein. The device 505 may include a receiver 510, a UE communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to high-reliability MCS and LCP, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include an LCP component 520, a grant component 525, an MCS component 530, and a logical channel component 535. The UE communications manager 515 may be an example of aspects of the UE communications manager 710 described herein.

The LCP component 520 may receive an LCP configuration for each logical channel of a set of logical channels during a connection procedure with a base station, the LCP configuration indicating allowable MCSs for each logical channel of the set of logical channels. The grant component 525 may receive an uplink grant for transmitting data using a corresponding logical channel of the set of logical channels. The MCS component 530 may identify an MCS associated with the received uplink grant. The logical channel component 535 may transmit the data using the corresponding logical channel with the identified MCS.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
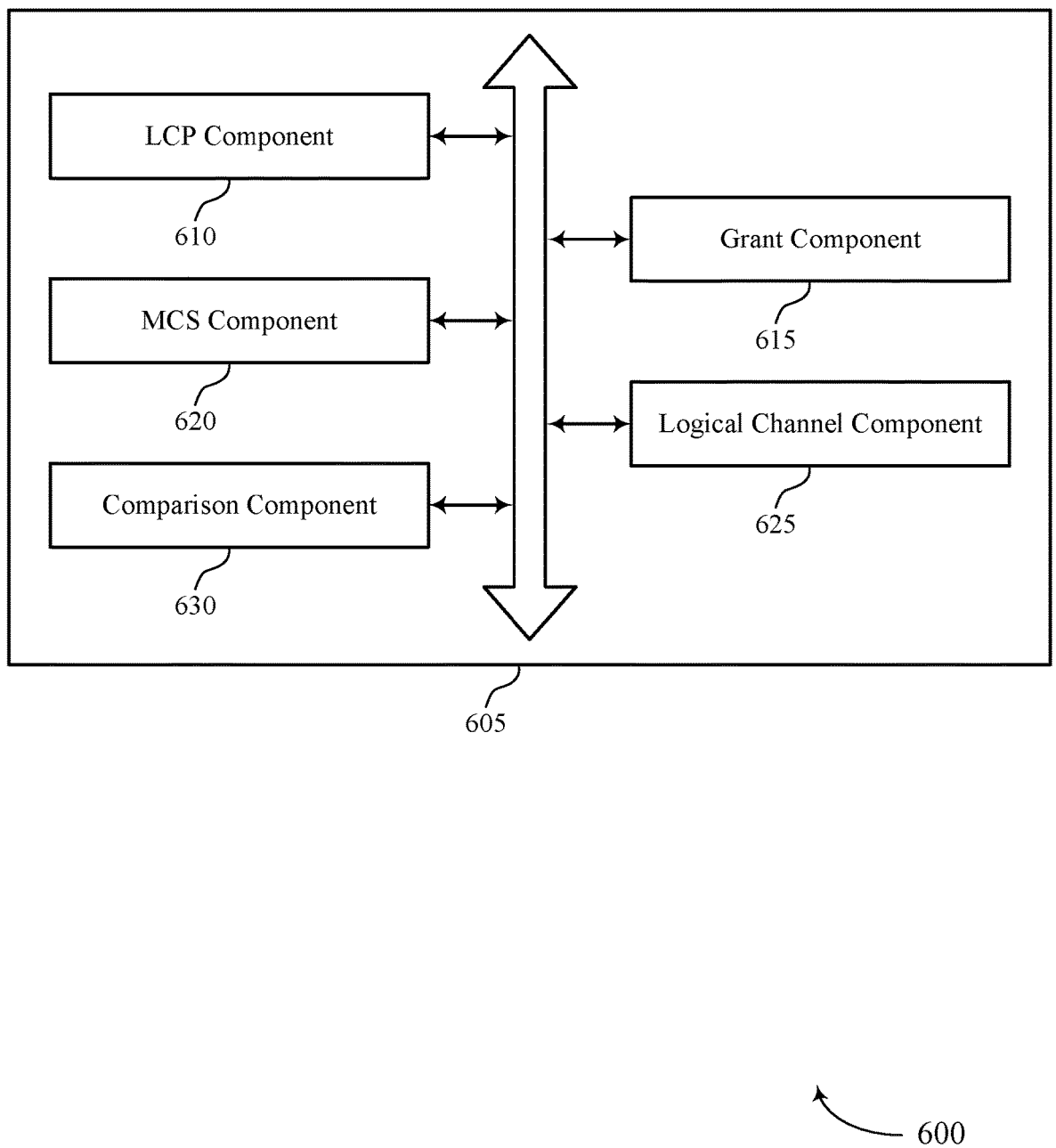
FIG. 6 shows a block diagram of a communications manager that supports high-reliability MCS and LCP in accordance with aspects of the present disclosure.

FIG. 6 shows a block diagram 600 of a UE communications manager 605 that supports high-reliability MCS and LCP in accordance with aspects of the present disclosure. The UE communications manager 605 may be an example of aspects of a UE communications manager 415, a UE communications manager 515, or a UE communications manager 710 described herein. The UE communications manager 605 may include an LCP component 610, a grant component 615, an MCS component 620, a logical channel component 625, and a comparison component 630. Each of these modules may communicate, directly or indirectly, with one another (e.g., via one or more buses).

The LCP component 610 may receive an LCP configuration for each logical channel of a set of logical channels during a connection procedure with a base station, the LCP configuration indicating allowable MCSs for each logical channel of the set of logical channels. In some examples, the LCP component 610 may determine a set of allowed subcarrier spacing index values in a field of the LCP configuration for the corresponding logical channel of the set of logical channels.

In some examples, the LCP component 610 may identify that the set of allowed subcarrier spacing index values in the field of the LCP configuration for the corresponding logical channel includes a subcarrier spacing index associated with the received uplink grant. In some examples, the LCP component 610 may determine that a maximum PUSCH transmission duration indicated in the LCP configuration for the corresponding logical channel is greater than or equal to a PUSCH transmission duration associated with the received uplink grant. In some examples, the LCP component 610 may determine an uplink grant type in a field of the LCP configuration.

The grant component 615 may receive an uplink grant for transmitting data using a corresponding logical channel of the set of logical channels. In some examples, the grant component 615 may identify cell information associated with the base station based on at least one transmission parameter of the uplink grant.

The MCS component 620 may identify an MCS associated with the received uplink grant. In some examples, the MCS component 620 may identify the allowable MCSs for each logical channel of the set of logical channels based on an indication in a field of a logical channel configuration IE in the LCP configuration. In some examples, the MCS component 620 may identify the MCS associated with the received uplink grant based on at least one transmission parameter associated with the received uplink grant.

The logical channel component 625 may transmit the data using the corresponding logical channel with the identified MCS. In some examples, the logical channel component 625 may refrain from using the corresponding logical channel for the received uplink grant based on the MCS associated with the received uplink grant being different from the allowable MCSs for the corresponding logical channel. In some examples, the logical channel component 625 may identify a second corresponding logical channel from the set of logical channels configured with the MCS associated with the received uplink grant based on comparing the MCS associated with the received uplink grant with the allowable MCSs for the second corresponding logical channel.

In some examples, the logical channel component 625 may select the second corresponding logical channel for transmitting the data based on the allowable MCSs configured for the second corresponding logical channel including the MCS associated with the received uplink grant. In some examples, the logical channel component 625 may determine whether to use the corresponding logical channel for the received uplink grant based on determining that the set of allowed subcarrier spacing index values in the field of the LCP configuration include the subcarrier spacing index associated with the received uplink grant, where transmitting the data using the corresponding logical channel is further based on the determining.

In some examples, the logical channel component 625 may determine whether to use the corresponding logical channel for the received uplink grant based on determining that the maximum PUSCH transmission duration indicated in the LCP configuration is greater than or equal to a PUSCH transmission duration associated with the received uplink grant, where transmitting the data using the corresponding logical channel is further based on the determining. In some examples, the logical channel component 625 may determine whether to use the corresponding logical channel for the received uplink grant based on comparing the type of the received uplink grant with the uplink grant type in the field of the LCP configuration, where transmitting the data using the corresponding logical channel is further based on the determining. In some examples, the logical channel component 625 may determine whether to use the corresponding logical channel for the received uplink grant based on comparing the identified cell information with cell information in a field of the LCP configuration, where transmitting the data associated with the service using the corresponding logical channel is further based on the determining.

The comparison component 630 may compare the MCS associated with the received uplink grant with the allowable MCSs indicated in the LCP configuration for the corresponding logical channel based on identifying the MCS using the at least one transmission parameter. In some examples, the comparison component 630 may compare a type of the received uplink grant with the uplink grant type in the field of the LCP configuration. In some examples, the comparison component 630 may compare the identified cell information with cell information in a field of the LCP configuration.

Figure 7:
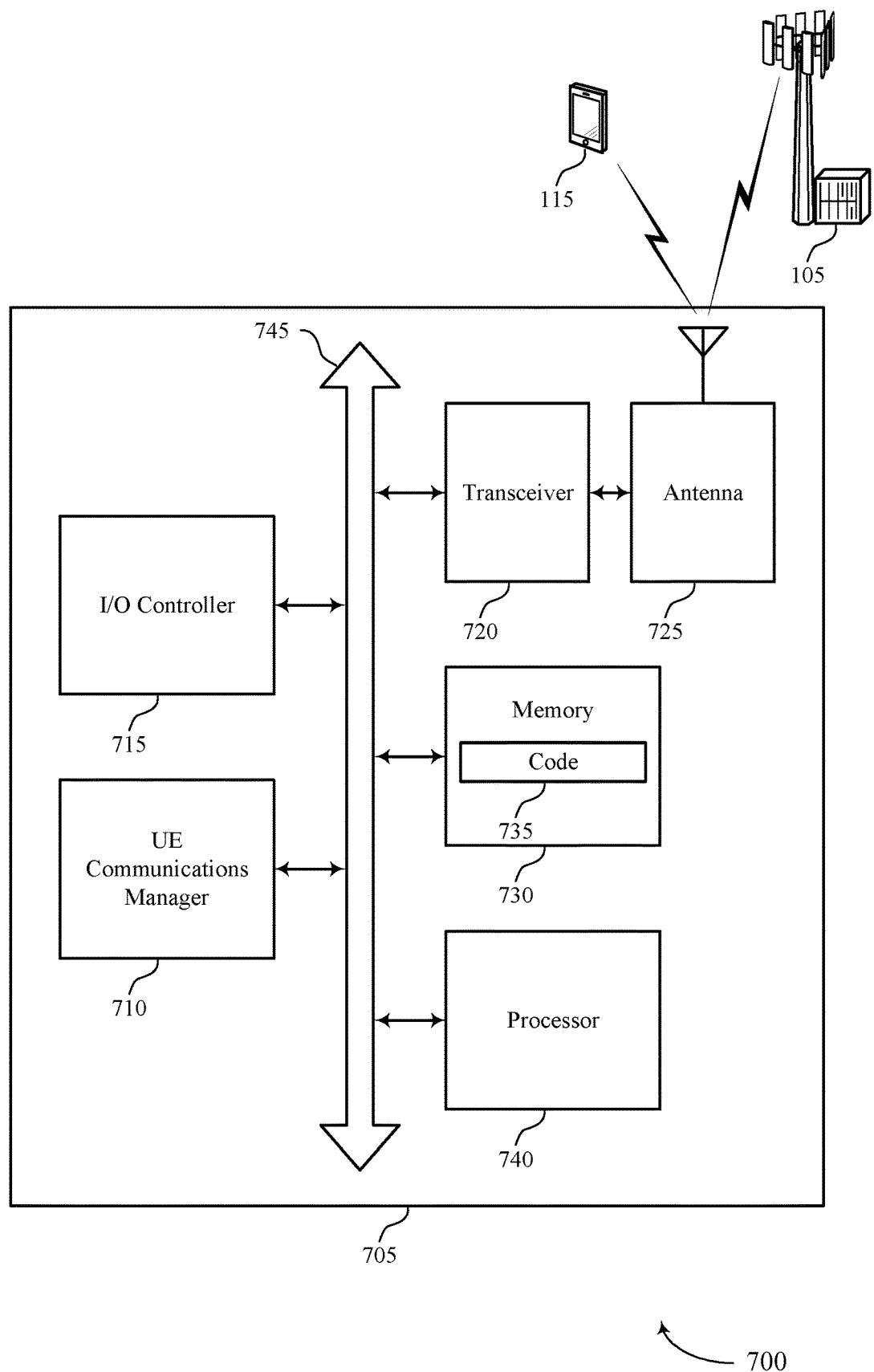
FIG. 7 shows a diagram of a system including a device that supports high-reliability MCS and LCP in accordance with aspects of the present disclosure.

FIG. 7 shows a diagram of a system 700 including a device 705 that supports high-reliability MCS and LCP in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may receive an LCP configuration for each logical channel of a set of logical channels during a connection procedure with a base station, the LCP configuration indicating allowable MCSs for each logical channel of the set of logical channels, receive an uplink grant for transmitting data using a corresponding logical channel of the set of logical channels, identify an MCS associated with the received uplink grant, and transmit the data using the corresponding logical channel with the identified MCS.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting high-reliability MCS and LCP).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
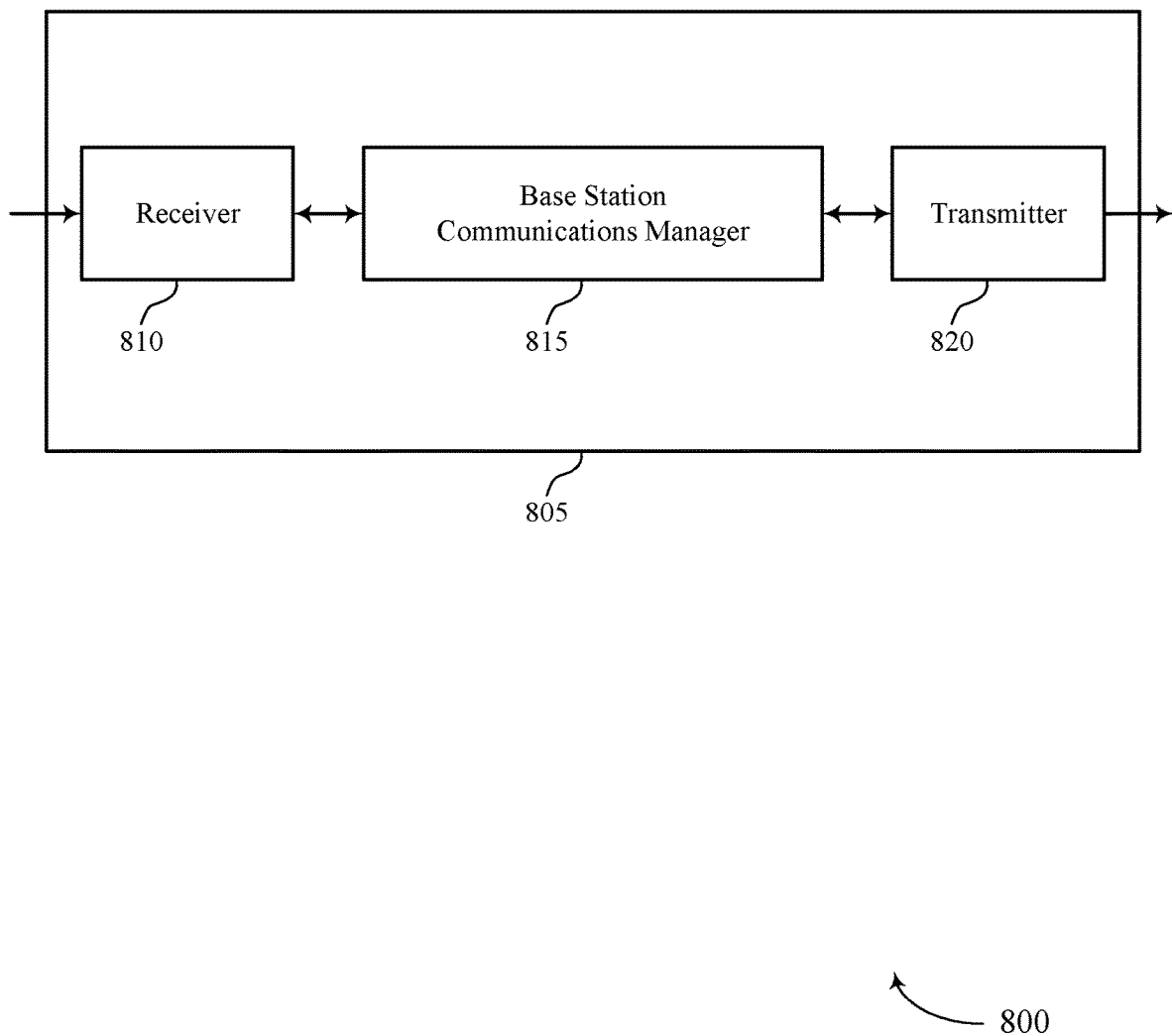
FIGS. 8 and 9 show block diagrams of devices that support high-reliability MCS and LCP in accordance with aspects of the present disclosure.

FIG. 8 shows a block diagram 800 of a device 805 that supports high-reliability MCS and LCP in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to high-reliability MCS and LCP, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may generate an LCP configuration for each logical channel of a set of logical channels associated with a UE, the LCP configuration indicating allowable MCSs for each logical channel of the set of logical channels, transmit the LCP configuration to the UE during a connection procedure with the UE, and transmit to the UE an uplink grant for transmitting data using a corresponding logical channel of the set of logical channels, the uplink grant indicating an MCS and information associated with one or more transmission parameters of the uplink grant. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
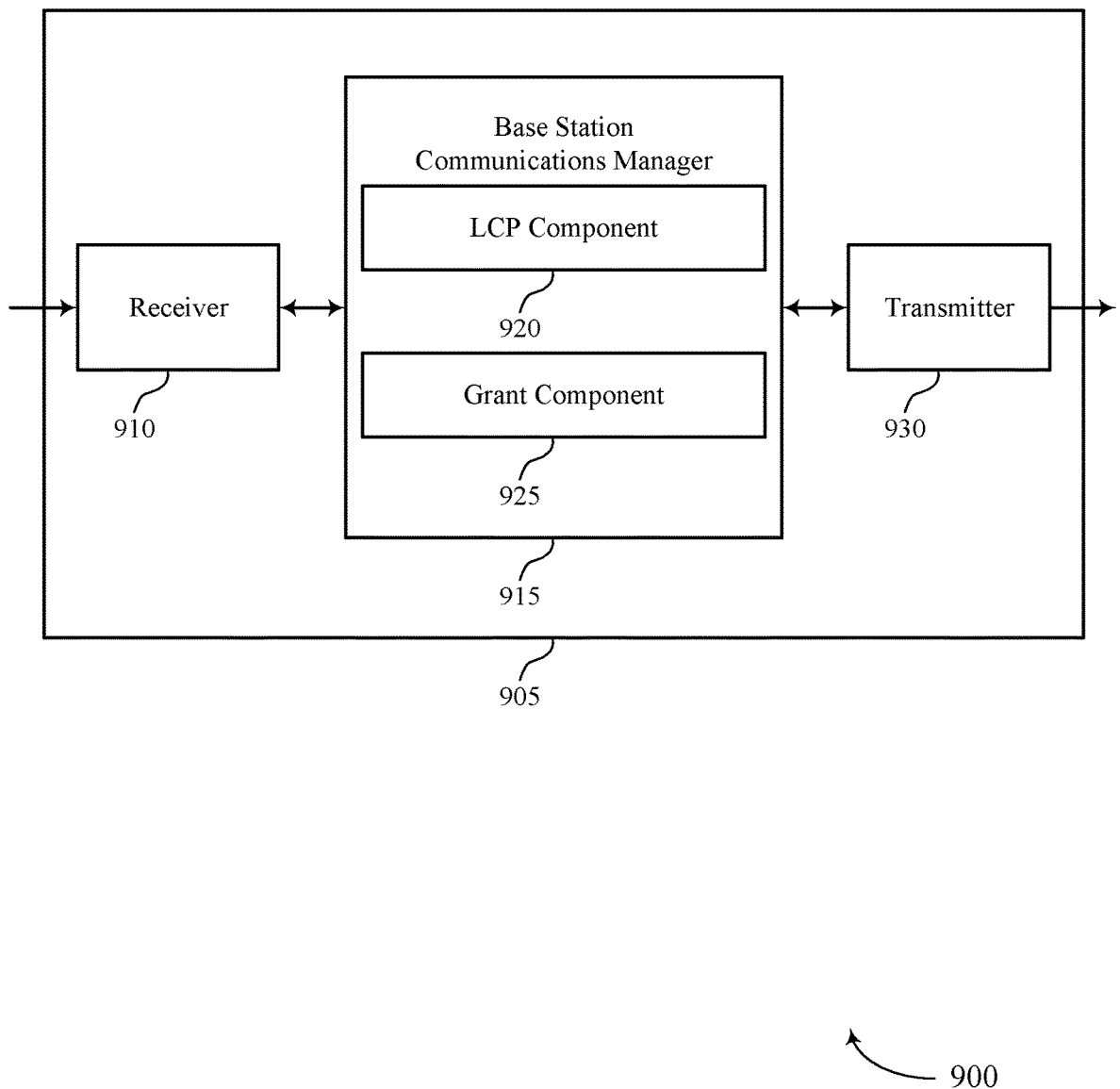

FIG. 9 shows a block diagram 900 of a device 905 that supports high-reliability MCS and LCP in accordance with aspects of the present disclosure. The device 905 may be an example of aspects of a device 805 or a base station 105 as described herein. The device 905 may include a receiver 910, a base station communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to high-reliability MCS and LCP, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include an LCP component 920 and a grant component 925. The base station communications manager 915 may be an example of aspects of the base station communications manager 1110 described herein.

The LCP component 920 may generate an LCP configuration for each logical channel of a set of logical channels associated with a UE, the LCP configuration indicating allowable MCSs for each logical channel of the set of logical channels and transmit the LCP configuration to the UE during a connection procedure with the UE. The grant component 925 may transmit to the UE an uplink grant for transmitting data using a corresponding logical channel of the set of logical channels, the uplink grant indicating an MCS and information associated with one or more transmission parameters of the uplink grant.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
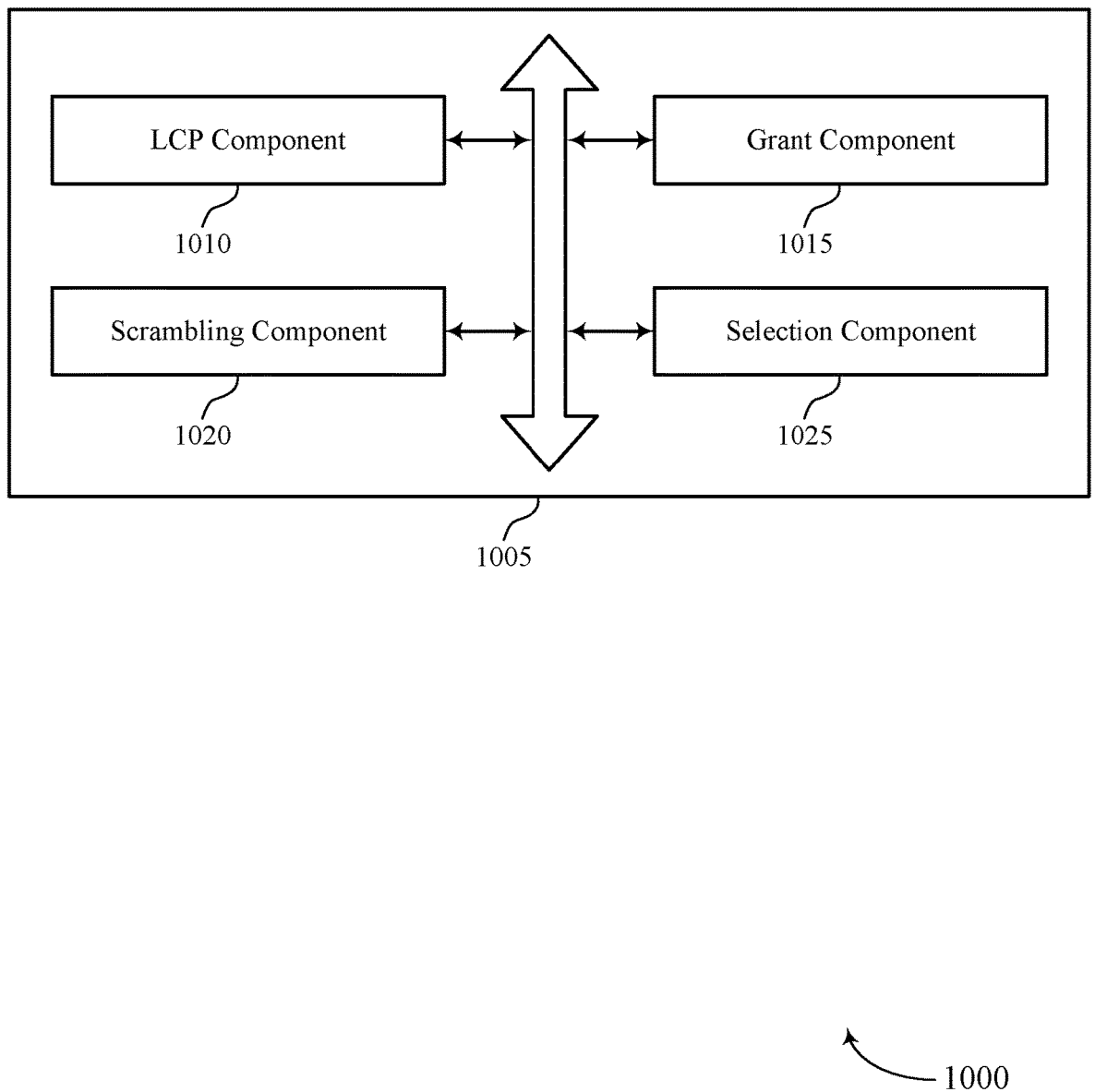
FIG. 10 shows a block diagram of a communications manager that supports high-reliability MCS and LCP in accordance with aspects of the present disclosure.

FIG. 10 shows a block diagram 1000 of a base station communications manager 1005 that supports high-reliability MCS and LCP in accordance with aspects of the present disclosure. The base station communications manager 1005 may be an example of aspects of a base station communications manager 815, a base station communications manager 915, or a base station communications manager 1110 described herein. The base station communications manager 1005 may include an LCP component 1010, a grant component 1015, a scrambling component 1020, and a selection component 1025. Each of these modules may communicate, directly or indirectly, with one another (e.g., via one or more buses).

The LCP component 1010 may generate an LCP configuration for each logical channel of a set of logical channels associated with a UE, the LCP configuration indicating allowable MCSs for each logical channel of the set of logical channels. In some examples, the LCP component 1010 may transmit the LCP configuration to the UE during a connection procedure with the UE.

The grant component 1015 may transmit to the UE an uplink grant for transmitting data using a corresponding logical channel of the set of logical channels, the uplink grant indicating an MCS and information associated with one or more transmission parameters of the uplink grant.

The scrambling component 1020 may scramble a CRC, in a DCI, with a RNTI and a C-RNTI, where transmitting the uplink grant is further based on the scrambling. The selection component 1025 may select one or more PDCCH candidates for transmitting the uplink grant, where the PDCCH candidates are associated with a UE-specific search space or a common search space, where transmitting the uplink grant is further based on using the PDCCH candidates.

Figure 11:
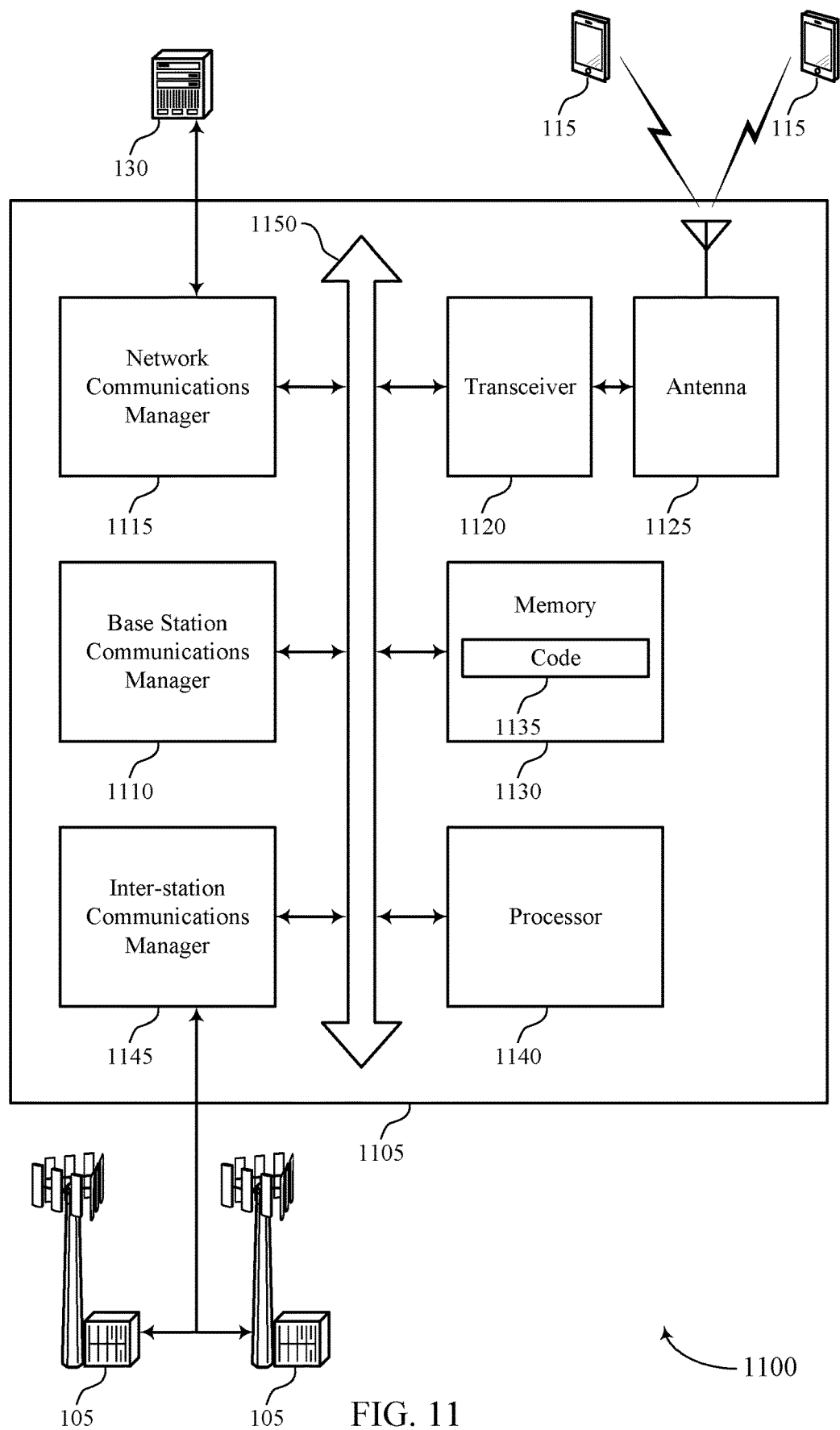
FIG. 11 shows a diagram of a system including a device that supports high-reliability MCS and LCP in accordance with aspects of the present disclosure.

FIG. 11 shows a diagram of a system 1100 including a device 1105 that supports high-reliability MCS and LCP in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may generate an LCP configuration for each logical channel of a set of logical channels associated with a UE, the LCP configuration indicating allowable MCSs for each logical channel of the set of logical channels, transmit the LCP configuration to the UE during a connection procedure with the UE, and transmit to the UE an uplink grant for transmitting data using a corresponding logical channel of the set of logical channels, the uplink grant indicating an MCS and information associated with one or more transmission parameters of the uplink grant.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting high-reliability MCS and LCP).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
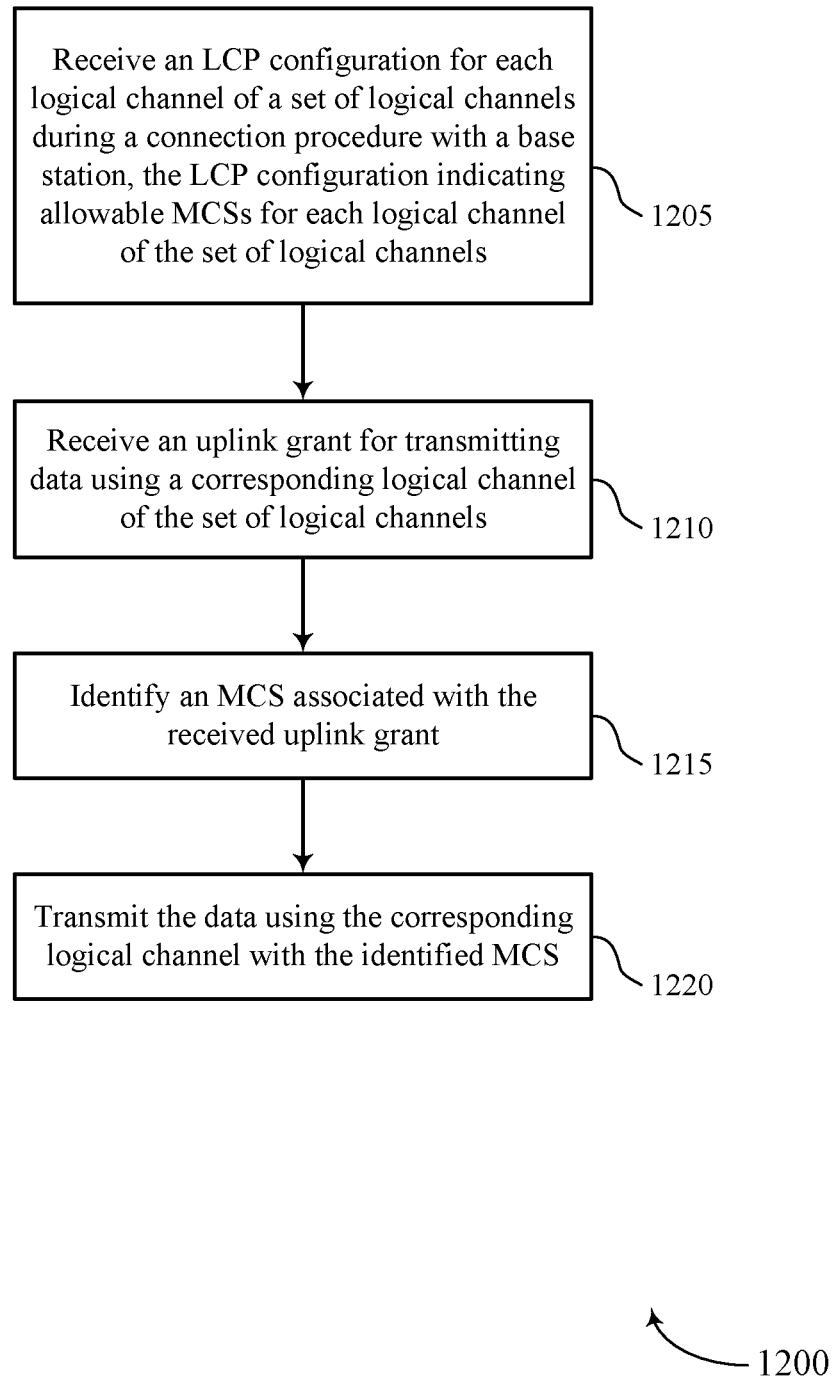
FIGS. 12 through 16 show flowcharts illustrating methods that support high-reliability MCS and LCP in accordance with aspects of the present disclosure.

FIG. 12 shows a flowchart illustrating a method 1200 that supports high-reliability MCS and LCP in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive an LCP configuration for each logical channel of a set of logical channels during a connection procedure with a base station, the LCP configuration indicating allowable MCSs for each logical channel of the set of logical channels. The operations of 1205 may be performed according to the methods described herein. In some examples, aspects of the operations of 1205 may be performed by an LCP component as described with reference to FIGS. 4 through 7.

At 1210, the UE may receive an uplink grant for transmitting data using a corresponding logical channel of the set of logical channels. The operations of 1210 may be performed according to the methods described herein. In some examples, aspects of the operations of 1210 may be performed by a grant component as described with reference to FIGS. 4 through 7.

At 1215, the UE may identify an MCS associated with the received uplink grant. The operations of 1215 may be performed according to the methods described herein. In some examples, aspects of the operations of 1215 may be performed by an MCS component as described with reference to FIGS. 4 through 7.

At 1220, the UE may transmit the data using the corresponding logical channel with the identified MCS. The operations of 1220 may be performed according to the methods described herein. In some examples, aspects of the operations of 1220 may be performed by a logical channel component as described with reference to FIGS. 4 through 7.

Figure 13:
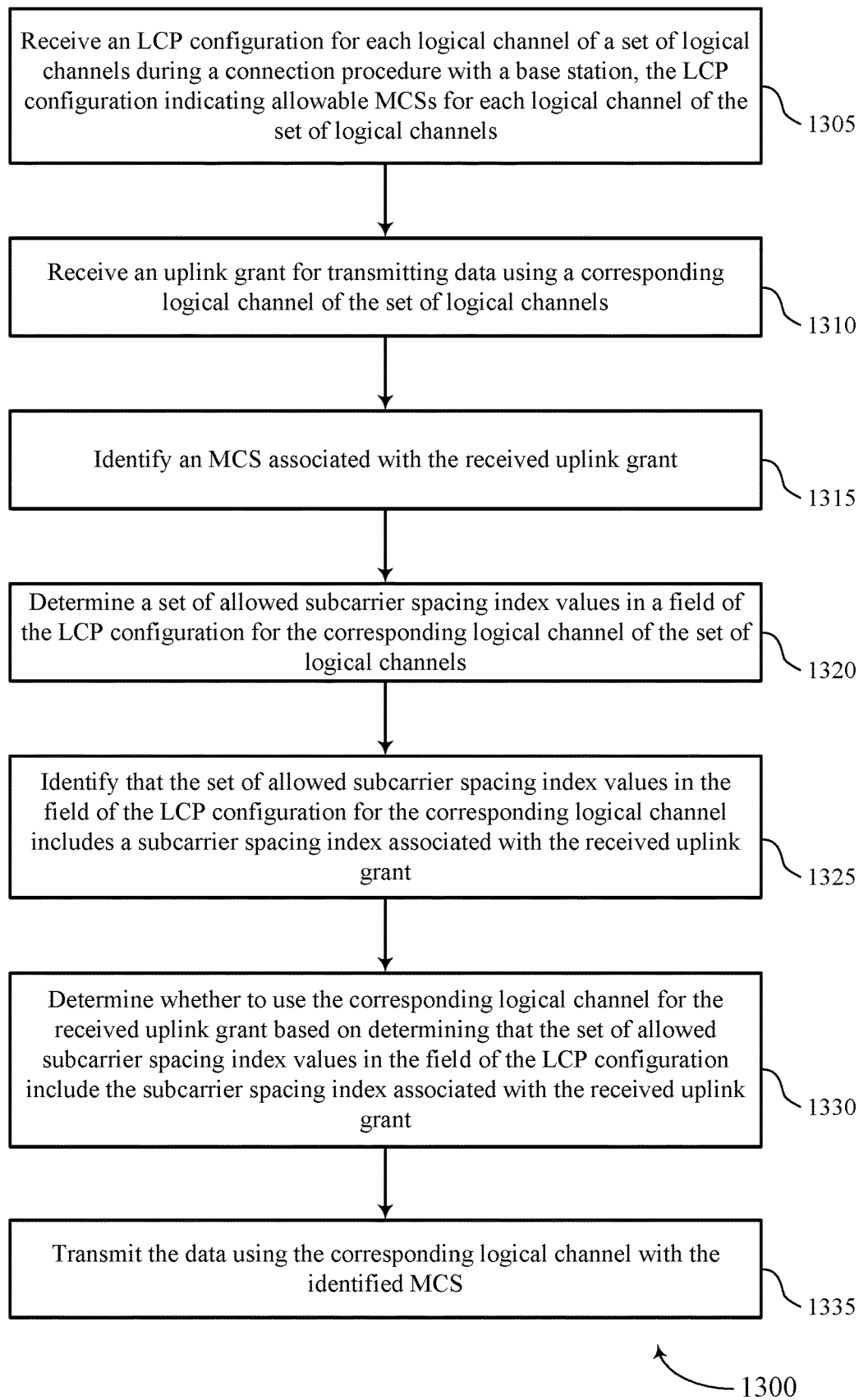

FIG. 13 shows a flowchart illustrating a method 1300 that supports high-reliability MCS and LCP in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive an LCP configuration for each logical channel of a set of logical channels during a connection procedure with a base station, the LCP configuration indicating allowable MCSs for each logical channel of the set of logical channels. The operations of 1305 may be performed according to the methods described herein. In some examples, aspects of the operations of 1305 may be performed by an LCP component as described with reference to FIGS. 4 through 7.

At 1310, the UE may receive an uplink grant for transmitting data using a corresponding logical channel of the set of logical channels. The operations of 1310 may be performed according to the methods described herein. In some examples, aspects of the operations of 1310 may be performed by a grant component as described with reference to FIGS. 4 through 7.

At 1315, the UE may identify an MCS associated with the received uplink grant. The operations of 1315 may be performed according to the methods described herein. In some examples, aspects of the operations of 1315 may be performed by an MCS component as described with reference to FIGS. 4 through 7.

At 1320, the UE may determine a set of allowed subcarrier spacing index values in a field of the LCP configuration for the corresponding logical channel of the set of logical channels. The operations of 1320 may be performed according to the methods described herein. In some examples, aspects of the operations of 1320 may be performed by an LCP component as described with reference to FIGS. 4 through 7.

At 1325, the UE may identify that the set of allowed subcarrier spacing index values in the field of the LCP configuration for the corresponding logical channel includes a subcarrier spacing index associated with the received uplink grant. The operations of 1325 may be performed according to the methods described herein. In some examples, aspects of the operations of 1325 may be performed by an LCP component as described with reference to FIGS. 4 through 7.

At 1330, the UE may determine whether to use the corresponding logical channel for the received uplink grant based on determining that the set of allowed subcarrier spacing index values in the field of the LCP configuration include the subcarrier spacing index associated with the received uplink grant. The operations of 1330 may be performed according to the methods described herein. In some examples, aspects of the operations of 1330 may be performed by a logical channel component as described with reference to FIGS. 4 through 7.

At 1335, the UE may transmit the data using the corresponding logical channel with the identified MCS. The operations of 1335 may be performed according to the methods described herein. In some examples, aspects of the operations of 1335 may be performed by a logical channel component as described with reference to FIGS. 4 through 7.

Figure 14:
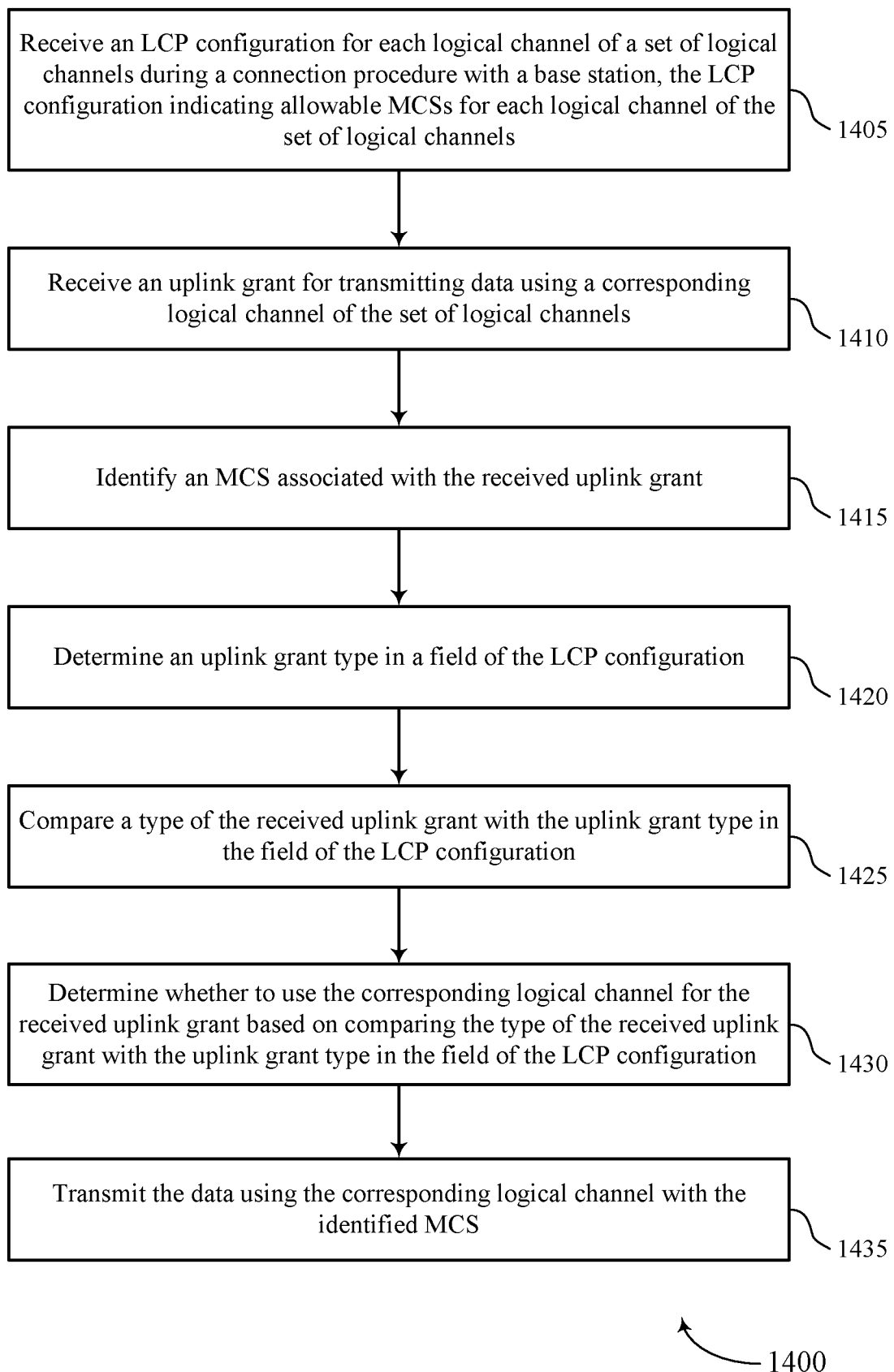

FIG. 14 shows a flowchart illustrating a method 1400 that supports high-reliability MCS and LCP in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive an LCP configuration for each logical channel of a set of logical channels during a connection procedure with a base station, the LCP configuration indicating allowable MCSs for each logical channel of the set of logical channels. The operations of 1405 may be performed according to the methods described herein. In some examples, aspects of the operations of 1405 may be performed by an LCP component as described with reference to FIGS. 4 through 7.

At 1410, the UE may receive an uplink grant for transmitting data using a corresponding logical channel of the set of logical channels. The operations of 1410 may be performed according to the methods described herein. In some examples, aspects of the operations of 1410 may be performed by a grant component as described with reference to FIGS. 4 through 7.

At 1415, the UE may identify an MCS associated with the received uplink grant. The operations of 1415 may be performed according to the methods described herein. In some examples, aspects of the operations of 1415 may be performed by an MCS component as described with reference to FIGS. 4 through 7.

At 1420, the UE may determine an uplink grant type in a field of the LCP configuration. The operations of 1420 may be performed according to the methods described herein. In some examples, aspects of the operations of 1420 may be performed by an LCP component as described with reference to FIGS. 4 through 7.

At 1425, the UE may compare a type of the received uplink grant with the uplink grant type in the field of the LCP configuration. The operations of 1425 may be performed according to the methods described herein. In some examples, aspects of the operations of 1425 may be performed by a comparison component as described with reference to FIGS. 4 through 7.

At 1430, the UE may determine whether to use the corresponding logical channel for the received uplink grant based on comparing the type of the received uplink grant with the uplink grant type in the field of the LCP configuration. The operations of 1430 may be performed according to the methods described herein. In some examples, aspects of the operations of 1430 may be performed by a logical channel component as described with reference to FIGS. 4 through 7.

At 1435, the UE may transmit the data using the corresponding logical channel with the identified MCS. The operations of 1435 may be performed according to the methods described herein. In some examples, aspects of the operations of 1435 may be performed by a logical channel component as described with reference to FIGS. 4 through 7.

Figure 15:
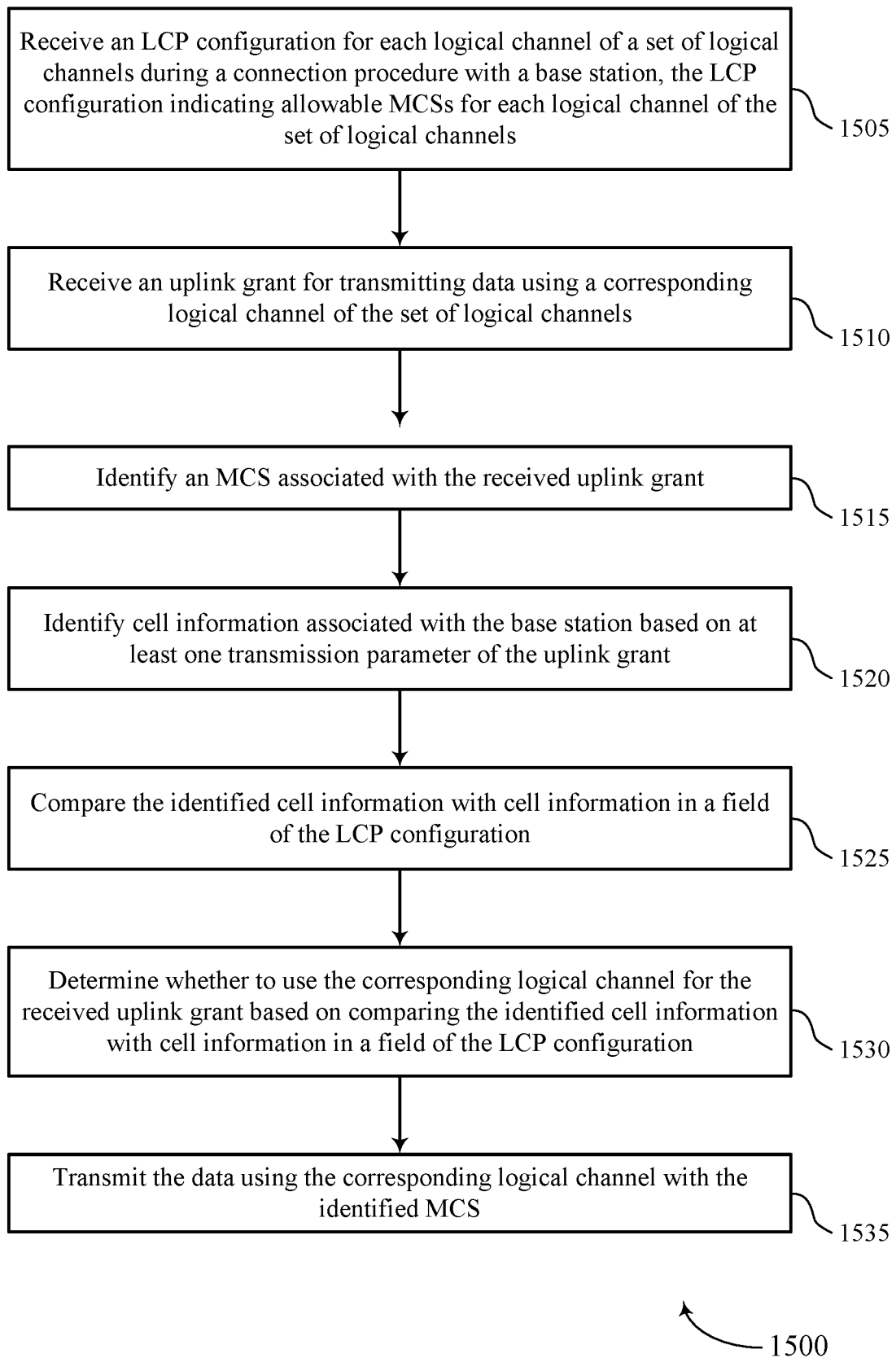

FIG. 15 shows a flowchart illustrating a method 1500 that supports high-reliability MCS and LCP in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive an LCP configuration for each logical channel of a set of logical channels during a connection procedure with a base station, the LCP configuration indicating allowable MCSs for each logical channel of the set of logical channels. The operations of 1505 may be performed according to the methods described herein. In some examples, aspects of the operations of 1505 may be performed by an LCP component as described with reference to FIGS. 4 through 7.

At 1510, the UE may receive an uplink grant for transmitting data using a corresponding logical channel of the set of logical channels. The operations of 1510 may be performed according to the methods described herein. In some examples, aspects of the operations of 1510 may be performed by a grant component as described with reference to FIGS. 4 through 7.

At 1515, the UE may identify an MCS associated with the received uplink grant. The operations of 1515 may be performed according to the methods described herein. In some examples, aspects of the operations of 1515 may be performed by an MCS component as described with reference to FIGS. 4 through 7.

At 1520, the UE may identify cell information associated with the base station based on at least one transmission parameter of the uplink grant. The operations of 1520 may be performed according to the methods described herein. In some examples, aspects of the operations of 1520 may be performed by a grant component as described with reference to FIGS. 4 through 7.

At 1525, the UE may compare the identified cell information with cell information in a field of the LCP configuration. The operations of 1525 may be performed according to the methods described herein. In some examples, aspects of the operations of 1525 may be performed by a comparison component as described with reference to FIGS. 4 through 7.

At 1530, the UE may determine whether to use the corresponding logical channel for the received uplink grant based on comparing the identified cell information with cell information in a field of the LCP configuration. The operations of 1530 may be performed according to the methods described herein. In some examples, aspects of the operations of 1530 may be performed by a logical channel component as described with reference to FIGS. 4 through 7.

At 1535, the UE may transmit the data using the corresponding logical channel with the identified MCS. The operations of 1535 may be performed according to the methods described herein. In some examples, aspects of the operations of 1535 may be performed by a logical channel component as described with reference to FIGS. 4 through 7.

Figure 16:
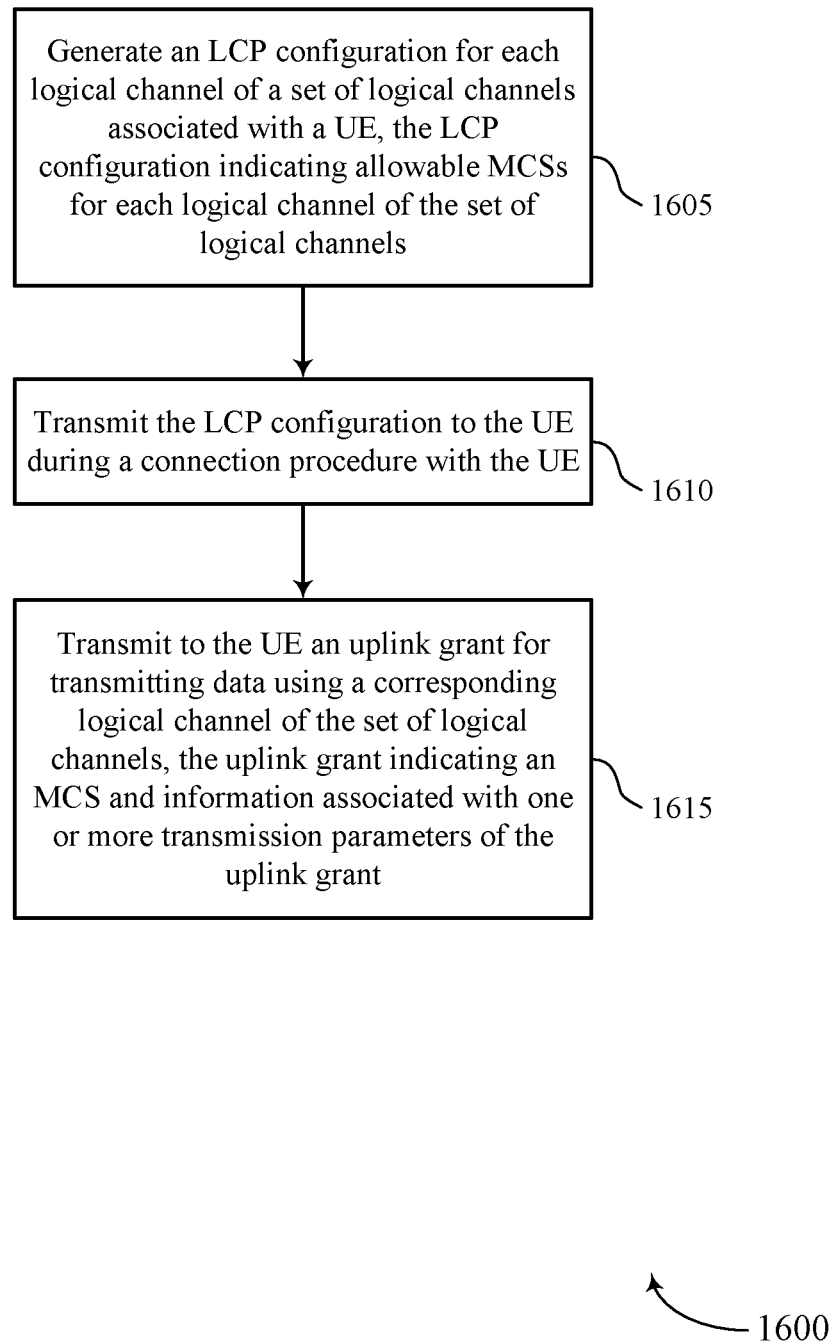

FIG. 16 shows a flowchart illustrating a method 1600 that supports high-reliability MCS and LCP in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may generate an LCP configuration for each logical channel of a set of logical channels associated with a UE, the LCP configuration indicating allowable MCSs for each logical channel of the set of logical channels. The operations of 1605 may be performed according to the methods described herein. In some examples, aspects of the operations of 1605 may be performed by an LCP component as described with reference to FIGS. 8 through 11.

At 1610, the base station may transmit the LCP configuration to the UE during a connection procedure with the UE. The operations of 1610 may be performed according to the methods described herein. In some examples, aspects of the operations of 1610 may be performed by an LCP component as described with reference to FIGS. 8 through 11.

At 1615, the base station may transmit to the UE an uplink grant for transmitting data using a corresponding logical channel of the set of logical channels, the uplink grant indicating an MCS and information associated with one or more transmission parameters of the uplink grant. The operations of 1615 may be performed according to the methods described herein. In some examples, aspects of the operations of 1615 may be performed by a grant component as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Embodiment 1: A method of wireless communication, comprising: receiving an LCP configuration for each logical channel of a set of logical channels during a connection procedure with a base station, the LCP configuration indicating allowable MCSs for each logical channel of the set of logical channels; receiving an uplink grant for transmitting data using a corresponding logical channel of the set of logical channels; identifying an MCS associated with the received uplink grant; and transmitting the data using the corresponding logical channel with the identified MCS.

Embodiment 2: The method of embodiment 1, further comprising: refraining from using the corresponding logical channel for the received uplink grant based at least in part on the MCS associated with the received uplink grant being different from the allowable MCSs for the corresponding logical channel.

Embodiment 3: The method of any of embodiments 1 or 2, further comprising: identifying a second corresponding logical channel from the set of logical channels configured with the MCS associated with the received uplink grant based at least in part on comparing the MCS associated with the received uplink grant with the allowable MCSs for the second corresponding logical channel; and selecting the second corresponding logical channel for transmitting the data based at least in part on the allowable MCSs configured for the second corresponding logical channel including the MCS associated with the received uplink grant.

Embodiment 4: The method of any of embodiments 1 to 3, further comprising: identifying the allowable MCSs for each logical channel of the set of logical channels based at least in part on an indication in a field of a logical channel configuration IE in the LCP configuration.

Embodiment 5: The method of any of embodiments 1 to 4, further comprising: identifying the MCS associated with the received uplink grant based at least in part on at least one transmission parameter associated with the received uplink grant; and comparing the MCS associated with the received uplink grant with the allowable MCSs indicated in the LCP configuration for the corresponding logical channel based at least in part on identifying the MCS using the at least one transmission parameter.

Embodiment 6: The method of any of embodiments 1 to 5, further comprising: determining a set of allowed subcarrier spacing index values in a field of the LCP configuration for the corresponding logical channel of the set of logical channels; identifying that the set of allowed subcarrier spacing index values in the field of the LCP configuration for the corresponding logical channel comprises a subcarrier spacing index associated with the received uplink grant; and determining whether to use the corresponding logical channel for the received uplink grant based at least in part on determining that the set of allowed subcarrier spacing index values in the field of the LCP configuration comprise the subcarrier spacing index associated with the received uplink grant, wherein transmitting the data using the corresponding logical channel is further based at least in part on the determining.

Embodiment 7: The method of any of embodiments 1 to 6, further comprising: determining that a maximum PUSCH transmission duration indicated in the LCP configuration for the corresponding logical channel is greater than or equal to a PUSCH transmission duration associated with the received uplink grant; and determining whether to use the corresponding logical channel for the received uplink grant based at least in part on determining that the maximum PUSCH transmission duration indicated in the LCP configuration is greater than or equal to the PUSCH transmission duration associated with the received uplink grant, wherein transmitting the data using the corresponding logical channel is further based at least in part on the determining.

Embodiment 8: The method of any of embodiments 1 to 7, further comprising: determining an uplink grant type in a field of the LCP configuration; comparing a type of the received uplink grant with the uplink grant type in the field of the LCP configuration; and determining whether to use the corresponding logical channel for the received uplink grant based at least in part on comparing the type of the received uplink grant with the uplink grant type in the field of the LCP configuration, wherein transmitting the data using the corresponding logical channel is further based at least in part on the determining.

Embodiment 9: The method of any of embodiments 1 to 8, further comprising: identifying cell information associated with the base station based at least in part on at least one transmission parameter of the uplink grant; comparing the identified cell information with cell information in a field of the LCP configuration; and determining whether to use the corresponding logical channel for the received uplink grant based at least in part on comparing the identified cell information with the cell information in the field of the LCP configuration, wherein transmitting the data using the corresponding logical channel is further based at least in part on the determining.

Embodiment 10: The method of any of embodiments 1 to 9, wherein the connection procedure comprises an RRC procedure.

Embodiment 11: An apparatus comprising at least one means for performing a method of any of embodiments 1 to 10.

Embodiment 12: An apparatus for wireless communications comprising a processor; memory coupled with the processor; and instructions stored in the memory and executable by the processor to cause the apparatus to perform a method of any of embodiments 1 to 10.

Embodiment 13: A non-transitory computer-readable medium storing code for wireless communications, the code comprising instructions executable by a processor to perform a method of any of embodiments 1 to 10.

Embodiment 14: A method for wireless communications, comprising: generating a logical channel prioritization (LCP) configuration for each logical channel of a set of logical channels associated with a user equipment (UE), the LCP configuration indicating allowable modulation coding schemes (MCSs) for each logical channel of the set of logical channels; transmitting the LCP configuration to the UE during a connection procedure with the UE; and transmitting to the UE an uplink grant for transmitting data using a corresponding logical channel of the set of logical channels, the uplink grant indicating an MCS and information associated with one or more transmission parameters of the uplink grant.

Embodiment 15: The method of embodiment 14, further comprising: scrambling a CRC, in a DCI, with a RNTI and a C-RNTI, wherein transmitting the uplink grant is further based at least in part on the scrambling.

Embodiment 16: The method of any of embodiments 14 or 15, further comprising: selecting one or more PDCCH candidates for transmitting the uplink grant, wherein the PDCCH candidates are associated with a UE-specific search space or a common search space, wherein transmitting the uplink grant is further based at least in part on using the PDCCH candidates.

Embodiment 17: The method of any of embodiments 14 to 16, wherein the connection procedure comprises an RRC procedure.

Embodiment 18: An apparatus comprising at least one means for performing a method of any of embodiments 14 to 17.

Embodiment 19: An apparatus for wireless communications comprising a processor; memory coupled with the processor; and instructions stored in the memory and executable by the processor to cause the apparatus to perform a method of any of embodiments 14 to 17.

Embodiment 20: A non-transitory computer-readable medium storing code for wireless communications, the code comprising instructions executable by a processor to perform a method of any of embodiments 14 to 17.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving a logical channel prioritization (LCP) configuration for each logical channel of a set of logical channels during a connection procedure with a base station, the LCP configuration indicating allowable modulation coding schemes (MCSs) for each logical channel of the set of logical channels;
receiving an uplink grant for transmitting data using a corresponding logical channel of the set of logical channels, an error detection code and a network identifier associated with the uplink grant indicating an MCS associated with the uplink grant;
identifying the MCS associated with the received uplink grant based at least in part on the error detection code and the network identifier;
comparing the MCS associated with the received uplink grant and the allowable MCSs for the corresponding logical channel; and
transmitting the data using the corresponding logical channel with the identified MCS based at least in part on the comparing.

2. The method of claim 1, further comprising:
refraining from using the corresponding logical channel for the received uplink grant based at least in part on the MCS associated with the received uplink grant being different from the allowable MCSs for the corresponding logical channel.

3. The method of claim 1, further comprising:
identifying a second corresponding logical channel from the set of logical channels configured with the MCS associated with the received uplink grant based at least in part on comparing the MCS associated with the received uplink grant with the allowable MCSs for the second corresponding logical channel; and
selecting the second corresponding logical channel for transmitting the data based at least in part on the allowable MCSs configured for the second corresponding logical channel including the MCS associated with the received uplink grant.

4. The method of claim 1, further comprising:
identifying the allowable MCSs for each logical channel of the set of logical channels based at least in part on an indication in a field of a logical channel configuration information element (IE) in the LCP configuration.

5. The method of claim 1, further comprising:
identifying the MCS associated with the received uplink grant based at least in part on at least one transmission parameter associated with the received uplink grant; and
comparing the MCS associated with the received uplink grant with the allowable MCSs indicated in the LCP configuration for the corresponding logical channel based at least in part on identifying the MCS using the at least one transmission parameter.

6. The method of claim 1, further comprising:
determining a set of allowed subcarrier spacing index values in a field of the LCP configuration for the corresponding logical channel of the set of logical channels;
identifying that the set of allowed subcarrier spacing index values in the field of the LCP configuration for the corresponding logical channel comprises a subcarrier spacing index associated with the received uplink grant; and
determining whether to use the corresponding logical channel for the received uplink grant based at least in part on determining that the set of allowed subcarrier spacing index values in the field of the LCP configuration comprise the subcarrier spacing index associated with the received uplink grant, wherein transmitting the data using the corresponding logical channel is further based at least in part on the determining.

7. The method of claim 1, further comprising:
determining that a maximum physical uplink shared channel (PUSCH) transmission duration indicated in the LCP configuration for the corresponding logical channel is greater than or equal to a PUSCH transmission duration associated with the received uplink grant; and
determining whether to use the corresponding logical channel for the received uplink grant based at least in part on determining that the maximum PUSCH transmission duration indicated in the LCP configuration is greater than or equal to the PUSCH transmission duration associated with the received uplink grant, wherein transmitting the data using the corresponding logical channel is further based at least in part on the determining.

8. The method of claim 1, further comprising:
determining an uplink grant type in a field of the LCP configuration;
comparing a type of the received uplink grant with the uplink grant type in the field of the LCP configuration; and
determining whether to use the corresponding logical channel for the received uplink grant based at least in part on comparing the type of the received uplink grant with the uplink grant type in the field of the LCP configuration, wherein transmitting the data using the corresponding logical channel is further based at least in part on the determining.

9. The method of claim 1, further comprising:
identifying cell information associated with the base station based at least in part on at least one transmission parameter of the uplink grant;
comparing the identified cell information with cell information in a field of the LCP configuration; and
determining whether to use the corresponding logical channel for the received uplink grant based at least in part on comparing the identified cell information with the cell information in the field of the LCP configuration, wherein transmitting the data using the corresponding logical channel is further based at least in part on the determining.

10. The method of claim 1, wherein the connection procedure comprises a radio resource control (RRC) procedure.

11. A method for wireless communications, comprising:
generating a logical channel prioritization (LCP) configuration for each logical channel of a set of logical channels associated with a user equipment (UE), the LCP configuration indicating allowable modulation coding schemes (MCSs) for each logical channel of the set of logical channels;
transmitting the LCP configuration to the UE during a connection procedure with the UE;
transmitting to the UE an uplink grant for transmitting data using a corresponding logical channel of the set of logical channels, an error detection code and a network identifier associated with the uplink grant indicating an MCS and information associated with one or more transmission parameters of the uplink grant; and
receiving the data using the corresponding logical channel with the MCS based at least in part on a comparison between the MCS associated with the uplink grant and the allowable MCSs for the corresponding logical channel.

12. The method of claim 11, further comprising:
scrambling a cyclic redundancy check (CRC), in a downlink control information (DCI), with a radio network temporary identifier (RNTI) and a cell-RNTI (C-RNTI), wherein transmitting the uplink grant is further based at least in part on the scrambling.

13. The method of claim 10, further comprising:
selecting one or more physical downlink control channel (PDCCH) candidates for transmitting the uplink grant, wherein the PDCCH candidates are associated with a UE-specific search space or a common search space, wherein transmitting the uplink grant is further based at least in part on using the PDCCH candidates.

14. The method of claim 11, wherein the connection procedure comprises a radio resource control (RRC) procedure.

15. An apparatus for wireless communications, comprising: a processor, memory coupled with the processor; and instructions stored in the memory and executable by the processor to cause the apparatus to:
receive a logical channel prioritization (LCP) configuration for each logical channel of a set of logical channels during a connection procedure with a base station, the LCP configuration indicating allowable modulation coding schemes (MCSs) for each logical channel of the set of logical channels;

receive an uplink grant for transmitting data using a corresponding logical channel of the set of logical channels, an error detection code and a network identifier associated with the uplink grant indicating an MCS associated with the uplink grant;

identify the MCS associated with the received uplink grant based at least in part on the error detection code and the network identifier;

compare the MCS associated with the received uplink grant and the allowable MCSs for the corresponding logical channel; and transmit the data using the corresponding logical channel with the identified MCS based at least in part on the comparing.

16. The apparatus of claim 15, wherein the instructions are further executable by the processor to cause the apparatus to:

refrain from using the corresponding logical channel for the received uplink grant based at least in part on the MCS associated with the received uplink grant being different from the allowable MCSs for the corresponding logical channel.

17. The apparatus of claim 15, wherein the instructions are further executable by the processor to cause the apparatus to:

identify a second corresponding logical channel from the set of logical channels configured with the MCS associated with the received uplink grant based at least in part on comparing the MCS associated with the received uplink grant with the allowable MCSs for the second corresponding logical channel; and select the second corresponding logical channel for transmitting the data based at least in part on the allowable MCSs configured for the second corresponding logical channel including the MCS associated with the received uplink grant.

18. The apparatus of claim 15, wherein the instructions are further executable by the processor to cause the apparatus to:

identify the allowable MCSs for each logical channel of the set of logical channels based at least in part on an indication in a field of a logical channel configuration information element (IE) in the LCP configuration.

19. The apparatus of claim 15, wherein the instructions are further executable by the processor to cause the apparatus to:

identify the MCS associated with the received uplink grant based at least in part on at least one transmission parameter associated with the received uplink grant; and compare the MCS associated with the received uplink grant with the allowable MCSs indicated in the LCP configuration for the corresponding logical channel based at least in part on identifying the MCS using the at least one transmission parameter.

20. The apparatus of claim 15, wherein the instructions are further executable by the processor to cause the apparatus to:

determine a set of allowed subcarrier spacing index values in a field of the LCP configuration for the corresponding logical channel of the set of logical channels;

identify that the set of allowed subcarrier spacing index values in the field of the LCP configuration for the corresponding logical channel comprises a subcarrier spacing index associated with the received uplink grant; and determine whether to use the corresponding logical channel for the received uplink grant based at least in part on determining that the set of allowed subcarrier spacing index values in the field of the LCP configuration comprise the subcarrier spacing index associated with the received uplink grant, wherein transmitting the data using the corresponding logical channel is further based at least in part on the determining.

21. The apparatus of claim 15, wherein the instructions are further executable by the processor to cause the apparatus to:

determine that a maximum physical uplink shared channel (PUSCH) transmission duration indicated in the LCP configuration for the corresponding logical channel is greater than or equal to a PUSCH transmission duration associated with the received uplink grant; and determine whether to use the corresponding logical channel for the received uplink grant based at least in part on determining that the maximum PUSCH transmission duration indicated in the LCP configuration is greater than or equal to the PUSCH transmission duration associated with the received uplink grant, wherein transmitting the data using the corresponding logical channel is further based at least in part on the determining.

22. The apparatus of claim 15, wherein the instructions are further executable by the processor to cause the apparatus to:

determine an uplink grant type in a field of the LCP configuration;

compare a type of the received uplink grant with the uplink grant type in the field of the LCP configuration; and determine whether to use the corresponding logical channel for the received uplink grant based at least in part on comparing the type of the received uplink grant with the uplink grant type in the field of the LCP configuration, wherein transmitting the data using the corresponding logical channel is further based at least in part on the determining.

23. The apparatus of claim 15, wherein the instructions are further executable by the processor to cause the apparatus to:

identify cell information associated with the base station based at least in part on at least one transmission parameter of the uplink grant;

compare the identified cell information with cell information in a field of the LCP configuration; and determine whether to use the corresponding logical channel for the received uplink grant based at least in part on comparing the identified cell information with the cell information in the field of the LCP configuration, wherein transmitting the data using the corresponding logical channel is further based at least in part on the determining.

24. The apparatus of claim 15, wherein the connection procedure comprises a radio resource control (RRC) procedure.

25. An apparatus for wireless communications, comprising: a processor, memory coupled with the processor; and instructions stored in the memory and executable by the processor to cause the apparatus to:

generate a logical channel prioritization (LCP) configuration for each logical channel of a set of logical channels associated with a user equipment (UE), the LCP configuration indicating allowable modulation coding schemes (MCSs) for each logical channel of the set of logical channels;

transmit the LCP configuration to the UE during a connection procedure with the UE; and transmit to the UE an uplink grant for transmitting data using a corresponding logical channel of the set of logical channels, an error detection code and a network identifier associated with the uplink grant indicating an MCS and information associated with one or more transmission parameters of the uplink grant;

receive the data using the corresponding logical channel with the MCS based at least in part on a comparison between the MCS associated with the uplink grant and the allowable MCSs for the corresponding logical channel.

26. The apparatus of claim 25, wherein the instructions are further executable by the processor to cause the apparatus to:

scramble a cyclic redundancy check (CRC), in a downlink control information (DCI), with a radio network temporary identifier (RNTI) and a cell-RNTI (C-RNTI), wherein transmitting the uplink grant is further based at least in part on the scrambling.

27. The apparatus of claim 25, wherein the instructions are further executable by the processor to cause the apparatus to:

select one or more physical downlink control channel (PDCCH) candidates for transmitting the uplink grant, wherein the PDCCH candidates are associated with a UE-specific search space or a common search space, wherein transmitting the uplink grant is further based at least in part on using the PDCCH candidates.

28. The apparatus of claim 25, wherein the connection procedure comprises a radio resource control (RRC) procedure.

* * * * *